US012586537B2

(12) United States Patent
Kang et al.

(10) Patent No.: US 12,586,537 B2
(45) Date of Patent: Mar. 24, 2026

(54) DISPLAY APPARATUS

(71) Applicant: Samsung Display Co., Ltd., Yongin-si (KR)

(72) Inventors: Byeongsoo Kang, Yongin-si (KR); Kwangwoo Park, Yongin-si (KR); Hyemin Park, Yongin-si (KR); Donghwan Shim, Yongin-si (KR); Jinyong Lee, Yongin-si (KR); Yongseon Jo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/917,611

(22) Filed: Oct. 16, 2024

(65) Prior Publication Data

US 2025/0273158 A1 Aug. 28, 2025

(30) Foreign Application Priority Data

Feb. 28, 2024 (KR) ........................ 10-2024-0029227

(51) Int. Cl.
*G09G 3/3266* (2016.01)
*G09G 3/3275* (2016.01)

(52) U.S. Cl.
CPC ......... *G09G 3/3266* (2013.01); *G09G 3/3275* (2013.01); *G09G 2310/0278* (2013.01)

(58) Field of Classification Search
None
See application file for complete search history.

(56) References Cited

U.S. PATENT DOCUMENTS 8,164,565 B2 * 4/2012 Tsou .................... G09G 3/3659 345/87
10,133,138 B2 11/2018 Oh et al.
10,573,261 B2 * 2/2020 Yamazaki ............ H10D 86/423
11,056,043 B2 7/2021 Oh et al.
11,436,974 B1 * 9/2022 Cha ...................... H10K 59/131
11,825,711 B2 * 11/2023 Lee ...................... H10K 59/131
12,272,288 B2 * 4/2025 Hong .................... G09G 3/2074
2017/0148404 A1 * 5/2017 Xing .................... G09G 3/3677
(Continued)

FOREIGN PATENT DOCUMENTS

KR 10-2081598 B1 2/2020
KR 10-2020-0142645 A 12/2020
(Continued)

*Primary Examiner* — Nitin Patel
*Assistant Examiner* — Amen W Bogale
(74) *Attorney, Agent, or Firm* — Womble Bond Dickinson (US) LLP

(57) ABSTRACT

A display apparatus having a thin bezel is provided. The display apparatus may include a substrate including a display area and a first peripheral area, a first gate driver, a data driver, a plurality of pixel groups in the display area and including at least a first pixel group, a second pixel group, a third pixel group, and a fourth pixel group, a first scan line extending in the first direction in a plan view, a second scan line extending in the first direction in a plan view, a third scan line extending in the first direction in a plan view, and a first horizontal scan line extending in a second direction in a plan view and connecting the first scan line and the third scan line to each other, the second direction crossing the first direction.

20 Claims, 13 Drawing Sheets

(56) References Cited

U.S. PATENT DOCUMENTS

| | | | | |
|---|---|---|---|---|
| 2018/0122329 | A1* | 5/2018 | Chen | G09G 5/003 |
| 2019/0392762 | A1* | 12/2019 | Kawamura | G09G 3/3258 |
| 2021/0273035 | A1 | 9/2021 | Cho et al. | |
| 2021/0295755 | A1* | 9/2021 | Lin | G09G 3/20 |
| 2022/0051606 | A1* | 2/2022 | Kim | G09G 3/2007 |
| 2022/0084469 | A1* | 3/2022 | Pyun | G09G 3/3266 |
| 2022/0246099 | A1* | 8/2022 | Ka | G09G 3/3258 |
| 2023/0083430 | A1 | 3/2023 | Hyun et al. | |
| 2023/0307461 | A1* | 9/2023 | Shin | H10D 86/441 |
| 2024/0118576 | A1* | 4/2024 | Lv | G02F 1/136286 |
| 2024/0203315 | A1* | 6/2024 | Hong | G09G 3/2074 |
| 2024/0381715 | A1* | 11/2024 | Yu | H10K 59/1201 |
| 2024/0397762 | A1* | 11/2024 | Chen | H10K 59/131 |

FOREIGN PATENT DOCUMENTS

| | | | |
|---|---|---|---|
| KR | 10-2022-0030467 | A | 3/2022 |
| KR | 10-2401213 | B1 | 5/2022 |
| KR | 10-2023-0039795 | A | 3/2023 |

* cited by examiner

DISPLAY APPARATUS

CROSS-REFERENCE TO RELATED APPLICATIONS

The present application claims priority to and the benefit of Korean Patent Application No. 10-2024-0029227, filed on Feb. 28, 2024, in the Korean Intellectual Property Office, the entire disclosure of which is incorporated by reference herein.

BACKGROUND

1. Field

One or more embodiments of the present disclosure relate to a display apparatus and, more particularly, to a display apparatus having a thin bezel.

2. Description of the Related Art

Display apparatuses receive input information about images and display the images. Display apparatuses are sometimes used as displays for small products, such as mobile phones, and are also used as displays for large products, such as televisions.

A display apparatus includes a plurality of pixels that receive an electrical signal and emit light to display an image to the outside. Each pixel includes a light-emitting element, and for example, in the case of organic light-emitting display apparatuses, an organic light-emitting diode (OLED) is included as a light-emitting element. In general, an organic light-emitting display apparatus has a thin-film transistor and an OLED on a substrate, and the OLED operates by emitting light by itself.

In addition, these display apparatuses have a bezel around a display area, and research has been conducted to reduce the area of the bezel in accordance with the trend of slimming display apparatuses.

SUMMARY

One or more embodiments include a display apparatus having a thin bezel. However, one or more embodiments discussed in the present disclosure are examples and do not limit the scope of the present disclosure.

Aspects will be set forth in part in the description that follows and, in part, will be apparent from the description, or may be learned by practice of the embodiments of the present disclosure.

According to one or more embodiments, a display apparatus includes a substrate including a display area and a first peripheral area, the first peripheral area being on one side of the display area, a first gate driver in the first peripheral area, a data driver in the first peripheral area, a plurality of pixel groups in the display area and including a plurality of display elements arranged along a first direction in a plan view, the plurality of pixel groups including at least a first pixel group, a second pixel group, a third pixel group, and a fourth pixel group, a first scan line extending in the first direction in a plan view and connecting the first gate driver and the first pixel group to each other, a second scan line extending in the first direction in a plan view and connecting the first gate driver and the second pixel group to each other, a third scan line extending in the first direction in a plan view and connecting the first gate driver and the third pixel group to each other, and a first horizontal scan line extending in a second direction in a plan view and connecting the first scan line and the third scan line to each other, the second direction crossing the first direction.

According to one or more embodiments, the first scan line may be configured to receive a first scan signal from the first gate driver and transmit the first scan signal to the first pixel group, and the third scan line may be configured to receive the first scan signal through the first horizontal scan line and transmit the first scan signal to the third pixel group.

According to one or more embodiments, the display apparatus may further include a fourth scan line extending in the first direction in a plan view and connecting the first gate driver and the fourth pixel group to each other, and a second horizontal scan line extending in the second direction in a plan view and connecting the second scan line and the fourth scan line to each other.

According to one or more embodiments, the second scan line may be configured to receive a second scan signal from the first gate driver and transmit the second scan signal to the second pixel group, and the fourth scan line may be configured to receive the second scan signal through the second horizontal scan line and transmit the second scan signal to the fourth pixel group.

According to one or more embodiments, the display apparatus may further include a first data line connected to a display element of the first pixel group and extending in the second direction in a plan view, and a first vertical data line extending in the first direction in a plan view and connecting the first data line and the data driver to each other.

According to one or more embodiments, in a plan view, the first gate driver may be located at one side of the first peripheral area, and the data driver may be located at the other side of the first peripheral area.

According to one or more embodiments, in a plan view, the first vertical data line may be in an area of the display area, the area corresponding to the other side of the first peripheral area.

According to one or more embodiments, in a plan view, the first scan line may be in an area of the display area, the area corresponding to the one side of the first peripheral area.

According to one or more embodiments, the display apparatus may further include a plurality of scan lines including at least the first scan line, the second scan line, and the third scan line, wherein the first horizontal scan line may be connected to 4n scan lines from among the plurality of scan lines.

According to one or more embodiments, one scan line from among the 4n scan lines may be connected to the first gate driver, and the 4n scan lines may be configured to receive a same scan signal generated by the first gate driver.

According to one or more embodiments, a display apparatus includes a substrate including a display area and a first peripheral area, the first peripheral area being on one side of the display area, a first gate driver in the first peripheral area, a data driver in the first peripheral area, a second gate driver in the first peripheral area, wherein, in a plan view, the second gate driver is between the first gate driver and the data driver, a plurality of pixel groups in the display area and including a plurality of display elements arranged along a first direction in a plan view, and a plurality of scan lines extending in the first direction in a plan view, wherein some scan lines from among the plurality of scan lines are connected to the first gate driver and other scan lines from among the plurality of scan lines are connected to the second gate driver, wherein the some scan lines and the other scan lines are connected to each other by a plurality of horizontal scan lines.

According to one or more embodiments, the plurality of pixel groups may include at least a first pixel group, a second pixel group, a third pixel group, a fourth pixel group, a fifth pixel group, a sixth pixel group, a seventh pixel group, and an eighth pixel group, and the plurality of scan lines may include a first scan line, a second scan line, a third scan line, a fourth scan line, a fifth scan line, a sixth scan line, a seventh scan line, and an eighth scan line respectively connected to the first pixel group to the eighth pixel group.

According to one or more embodiments, the plurality of horizontal scan lines may include a first horizontal scan line, and the first scan line may be connected to the first pixel group and connected to the fifth scan line and the seventh scan line by the first horizontal scan line.

According to one or more embodiments, the plurality of horizontal scan lines may further include a first additional horizontal scan line, and the seventh scan line may be connected to the third scan line by the first additional horizontal scan line.

According to one or more embodiments, in a plan view, the first horizontal scan line and the first additional horizontal scan line may be spaced from each other in the first direction.

According to one or more embodiments, the first pixel group, the third pixel group, the fifth pixel group, and the seventh pixel group may be configured to receive a same scan signal generated by the first gate driver.

According to one or more embodiments, the first scan line may be connected to the first gate driver, and the third scan line may be connected to the second gate driver.

According to one or more embodiments, the plurality of horizontal scan lines may further include a second horizontal scan line, and the second scan line may be connected to the second pixel group and connected to the sixth scan line and the eighth scan line by the second horizontal scan line.

According to one or more embodiments, the plurality of horizontal scan lines may further include a second additional horizontal scan line, and the eighth scan line may be connected to the fourth scan line by the second additional horizontal scan line.

According to one or more embodiments, the display apparatus may further include a first data line connected to a display element of the first pixel group and extending in a second direction in a plan view, the second direction crossing the first direction, and a first vertical data line extending in the first direction in a plan view and connecting the first data line and the data driver to each other.

BRIEF DESCRIPTION OF THE DRAWINGS

The above and other aspects and features of embodiments of the present disclosure will be more apparent from the following description taken in conjunction with the accompanying drawings, in which.

DETAILED DESCRIPTION

Figure 1:
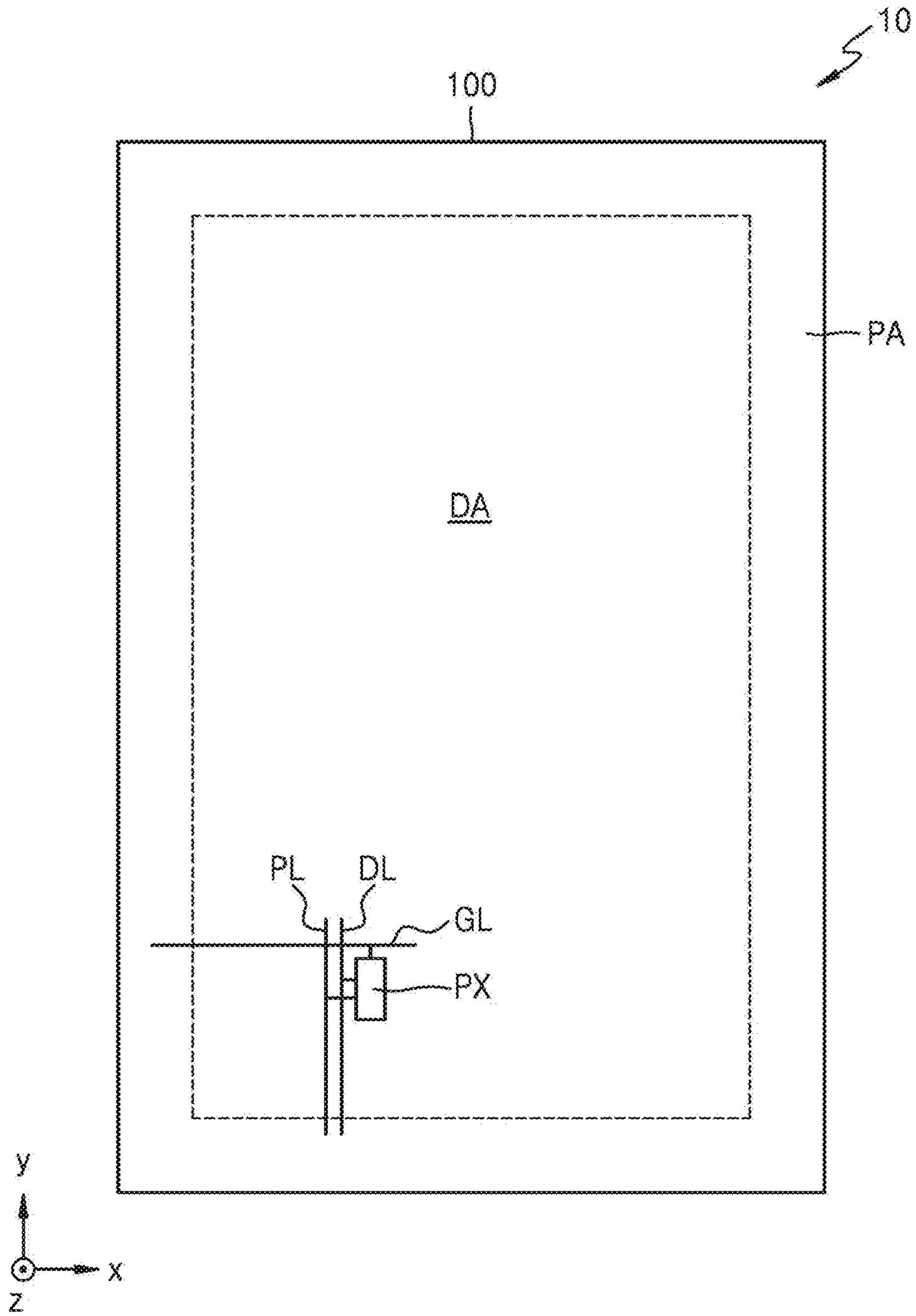
FIG. 1 is a schematic plan view of a display panel of a display apparatus according to one or more embodiments.

Reference will now be made in detail to one or more embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present disclosure. As used herein, the term "and/or" includes any and all combinations of one or more of the associated listed items. Throughout the present disclosure, the expression "at least one of a, b or c" indicates only a, only b, only c, both a and b, both a and c, both b and c, all of a, b, and c, or any variations thereof.

Because various modifications may be applied and one or more embodiments may be implemented, specific embodiments will be shown in the drawings and described in detail in the detailed description. Effects, aspects, and features, and methods for achieving them will be clarified with reference to embodiments described below in detail with reference to the drawings. However, embodiments may have different forms and should not be construed as being limited to the descriptions set forth herein.

Hereinafter, embodiments will now be described in detail with reference to the accompanying drawings. When described with reference to the drawings, identical or corresponding elements will be given the same reference numerals, and redundant description of these elements will be omitted.

It will be understood that although terms "first" and "second" may be used herein to describe various elements, these elements should not be limited by these terms and these terms are only used to distinguish one element from another. Also, in the following embodiments, the singular forms include the plural forms unless the context clearly indicates otherwise.

In the following embodiments, it will be understood that when an element, such as a layer, film, region, and/or plate, is referred to as being "on" another element, the element may be directly on the other element or indirectly on the other element with intervening elements therebetween.

Sizes of elements in the drawings may be exaggerated for convenience of explanation. For example, because sizes and thicknesses of elements in the drawings are arbitrarily illustrated for convenience of explanation, the following embodiments are not limited thereto.

It will be understood that terms "comprise," "include," and "have" used herein specify the presence of stated features or elements, but do not preclude the presence or addition of one or more other features or elements.

It will be further understood that, when a layer, region, or element is referred to as being "on" another layer, region, or element, it can be directly or indirectly on the other layer, region, and/or element. That is, e.g., intervening layers, regions, and/or elements may be present.

When a certain embodiment may be implemented differently, a specific process order may also be performed differently from the described order. As an example, two processes that are successively described may be performed substantially concurrently (e.g., simultaneously) or performed in an order opposite to the order described.

In the present specification, the expression "A and/or B" indicates A, B, or A and B. Also, the expression such as "at least one of A and B" indicates A, B, or A and B.

It will be understood that when a layer, region, or element is referred to as being "connected to" another layer, region, or element, it may be "directly connected to" the other layer, region, or element or may be "indirectly connected to" the other layer, region, or element with one or more intervening layers, regions, or elements therebetween. For example, it will be understood that when a layer, region, or element is referred to as being "electrically connected to" another layer, region, or element, it may be "directly electrically connected to" the other layer, region, or element and/or may be "indirectly electrically connected to" the other layer, region, or element with one or more intervening layers, regions, or elements therebetween.

In the following embodiments, the x-axis, the y-axis, and the z-axis are not limited to three axes of the rectangular coordinate system, and may be interpreted in a broader sense. For example, the x-axis, y-axis, and z-axis may be orthogonal to each other, but may refer to different directions that are not orthogonal to each other.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

Hereinafter, based on the aforementioned descriptions, a display apparatus according to one or more embodiments is described in detail as follows.

FIG. 1 is a schematic plan view of a display panel 10 of a display apparatus according to one or more embodiments.

As shown in FIG. 1, the display apparatus according to one or more embodiments may include the display panel 10. The display apparatus may be any apparatus that includes the display panel 10. For example, the display apparatus may be various apparatuses such as a smartphone, a tablet, a laptop computer, a television, and/or a billboard. The display apparatus according to one or more embodiments includes thin-film transistors (TFTs) and a capacitor, and the TFTs and the capacitor may be implemented by conductive layers and insulating layers.

The display panel 10 includes a display area DA and a peripheral area PA located outside the display area DA along an edge or a periphery of the display area DA. FIG. 1 shows that the display area DA has a rectangular shape. However, one or more embodiments are not limited thereto. The display area DA may have other various shapes such as a circular shape, an elliptical shape, a polygonal shape, and/or a specific figure shape.

The display area DA is an area where an image is displayed, and a plurality of pixels PX may be arranged in the display area DA. Each pixel PX may include a display element such as an organic light-emitting diode (OLED). Each pixel PX may emit, for example, red, green, or blue light. The pixel PX may be connected to a pixel circuit including a thin film transistor (TFT), a storage capacitor, and/or the like. The pixel circuit may include a scan line GL configured to transmit a scan signal, a data line DL that crosses the scan line GL and is configured to transmit a data signal, and a driving voltage line PL configured to supply a driving voltage. The scan line GL may extend in an x-direction (hereinafter referred to as a first direction), and the data line DL and the driving voltage line PL may extend in a y-direction (hereinafter referred to as a second direction).

The pixel PX may emit light having a luminance corresponding to an electrical signal from the pixel circuit electrically connected to the pixel PX. The display area DA may display a certain image through the light emitted from the pixel PX. For reference, the pixel PX may be defined as an emission area that emits light of any one color from among red, green, and blue, as described above.

The peripheral area PA may be an area in which the pixel PX is not arranged and may be an area where an image is not displayed. A power supply line configured to drive the pixel PX may be located in the peripheral area PA. Also, a plurality of pads may be arranged in the peripheral area PA, and an integrated circuit (IC) device such as a driver IC and/or a printed circuit board (PCB) including a driving circuit portion may be arranged to be electrically connected to the plurality of pads.

For reference, because the display panel 10 includes a substrate 100, the substrate 100 may also include the display area DA and the peripheral area PA. The substrate 100 is described in detail below.

Also, a plurality of transistors may be arranged in the display area DA. According to the type of transistor (N-type or P-type) and/or operating conditions, a first terminal of each of the plurality of transistors may be a source electrode or a drain electrode, and a second terminal thereof may be an electrode different from the first terminal. For example, when the first terminal is a source electrode, the second terminal may be a drain electrode.

The plurality of transistors may include a driving transistor, a data writing transistor, a compensation transistor, an initialization transistor, an emission control transistor, etc. The driving transistor may be connected between the driving voltage line PL and an OLED, and the data writing transistor may be connected to the data line DL and the driving transistor and configured to perform a switching operation of transmitting the data signal transmitted through the data line DL.

The compensation transistor may be turned on in response to the scan signal received through the scan line GL and may connect the driving transistor and the OLED to each other, thereby compensating for a threshold voltage of the driving transistor.

The initialization transistor may be turned on in response to the scan signal received through the scan line GL and may be configured to transmit an initialization voltage to a gate electrode of the driving transistor and initialize the gate electrode of the driving transistor. The scan line GL connected to the initialization transistor may be a separate scan line different from the scan line GL connected to the compensation transistor.

The emission control transistor may be turned on in response to an emission control signal received through an emission control line, and as a result, a driving current may flow through the OLED. The OLED may be configured to display an image by receiving a driving current from the driving transistor and emitting light.

Hereinafter, an organic light-emitting display apparatus is described as an example of the display apparatus according to the one or more embodiments, but the present disclosure is not limited thereto. In one or more embodiments, the display apparatus may include an inorganic light-emitting display apparatus (or inorganic electroluminescence (EL) display apparatus) and/or a quantum dot light-emitting display apparatus. For example, an emission layer of a display element included in the display apparatus may include an organic material or an inorganic material. Also, the display apparatus may include an emission layer and quantum dots on a path of light emitted from the emission layer.

Figure 2:
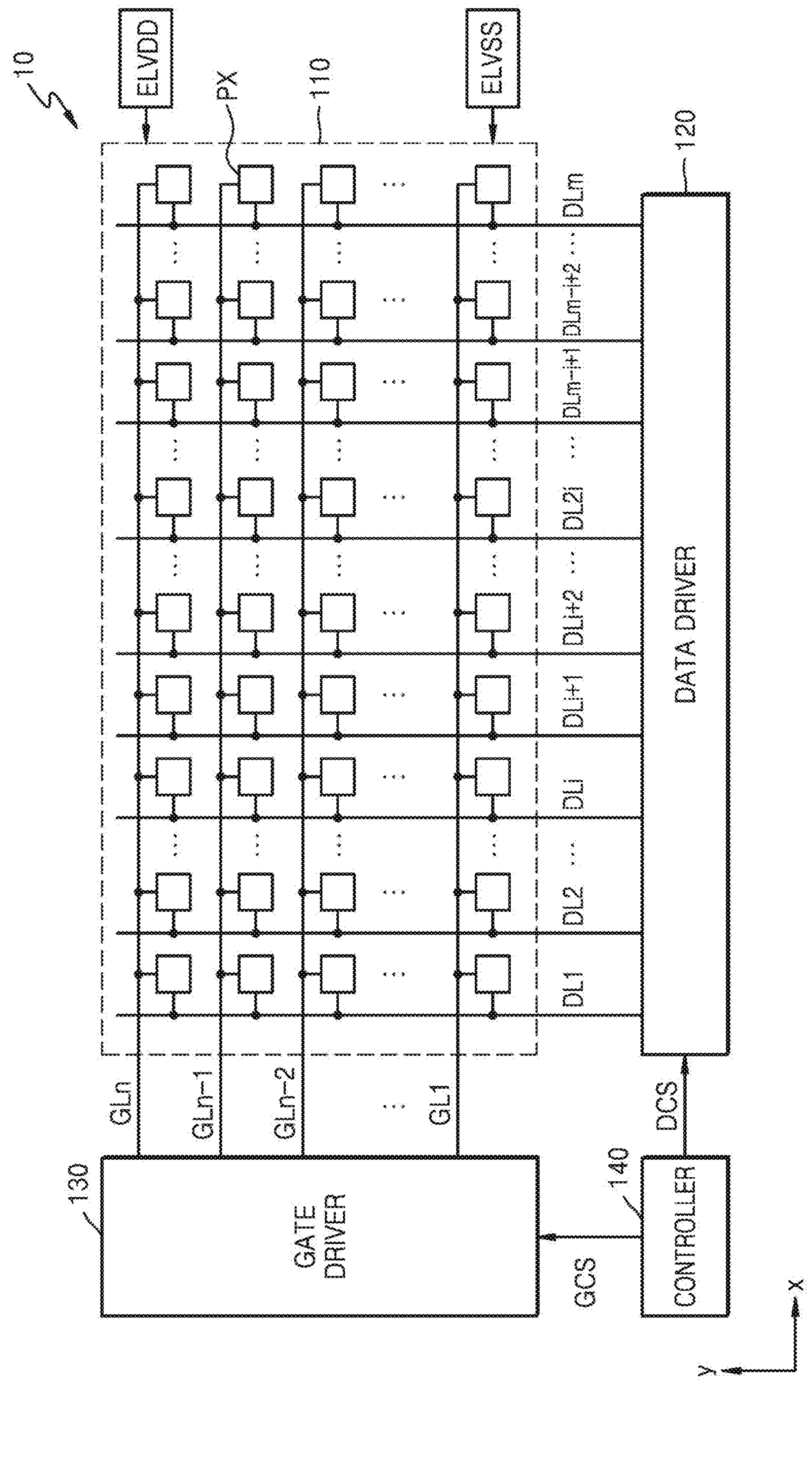
FIG. 2 is a schematic plan view of a display apparatus according to one or more embodiments.

FIG. 2 is a schematic plan view of a display apparatus according to one or more embodiments.

As shown in FIG. 2, the display apparatus according to one or more embodiments may include a pixel portion 110, a data driver 120, a gate driver 130, and a controller 140.

The pixel portion 110 in which the plurality of pixels PX are arranged may be provided in the display area DA. The data driver 120, the gate driver 130, and the controller 140 may be provided in the peripheral area PA.

Each of the plurality of pixels PX may be connected to one scan line among a plurality of scan lines GL1 to GLn and a corresponding data line from among a plurality of data lines DL1 to DLm. Each of the plurality of scan lines GL1 to GLn may extend in the first direction (e.g., an x-direction or a row direction) and may be connected to the pixels PX located in the same row. Each of the scan lines GL1 to GLn may be configured to transmit gate signals to the pixels PX in the same row. Each of the plurality of data lines DL1 to DLm may extend in the second direction (e.g., a y-direction or a column direction) and may be connected to the pixels PX located in the same column.

The gate driver 130 may be connected to the plurality of scan lines GL1 to GLn and configured to generate gate signals in response to a gate driving control signal GCS from the controller 140 and sequentially supply the gate signals to the scan lines GL1 to GLn. When the gate signals are sequentially supplied to the scan lines GL1 to GLn, the pixels PX may be selected in units of rows. Each of the data lines DL1 to DLm may be configured to transmit data signals to the pixels PX in a selected row. A scan line may be connected to a gate of a transistor included in each pixel PX. Each gate signal may be a gate control signal that controls turn-on and turn-off of the transistor connected to the scan line. The gate signal may be a square wave signal that repeats an on voltage at which the transistor may be turned on and an off voltage at which the transistor may be turned off.

The controller 140 may be configured to generate a data driving control signal DCS and a gate driving control signal GCS in response to synchronization signals supplied from the outside. The controller 140 may be configured to output the data driving control signal DCS to the data driver 120 and output the gate driving control signal GCS to the gate driver 130.

The gate driver 130 and the controller 140 may be directly formed on the substrate 100 (see FIG. 1). The data driver 120 may be arranged over a flexible printed circuit board (FPCB) that is electrically connected to a pad on one side of the substrate 100. In one or more embodiments, the data driver 120 may be directly disposed on the substrate 100 by using a chip-on-glass (COG) method or a chip-on-plastic (COP) method.

When the display apparatus is an organic light-emitting display apparatus, a first power voltage ELVDD and a second power voltage ELVSS may be supplied to the pixels PX of the display apparatus. The first power voltage ELVDD may be a high-level voltage supplied to a first electrode (e.g., a pixel electrode or an anode electrode) of a display element (e.g., a light-emitting element) included in each pixel PX. The second power voltage ELVSS may be a low-level voltage supplied to a second electrode (e.g., an opposite electrode or a cathode electrode) of the display element included in each pixel PX. The first power voltage ELVDD and the second power voltage ELVSS may be driving voltages that cause the plurality of pixels PX to emit light.

Hereinafter, an organic light-emitting display apparatus is described as an example of the display apparatus according to the present embodiment, but the present disclosure is not limited thereto. In one or more embodiments, the display apparatus may be include an inorganic light-emitting display apparatus (or an inorganic EL display apparatus) and/or a quantum dot light-emitting display apparatus.

Figure 3:
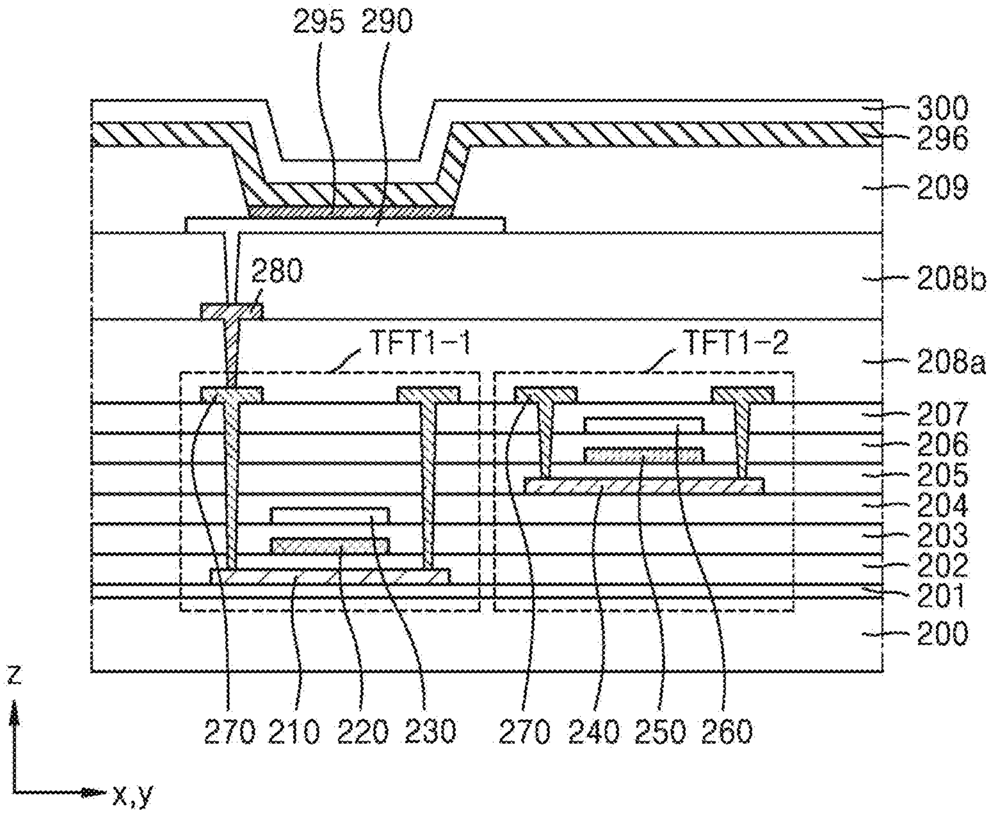
FIG. 3 is a schematic cross-sectional view illustrating a cross-section of an area of the display apparatus of FIG. 1.

FIG. 3 is a schematic cross-sectional view illustrating a cross-section of an area of the display apparatus of FIG. 1.

A substrate 200 of FIG. 3 may be the substrate 100 of FIG. 1. As described above, the substrate 200 may include areas corresponding to the display area DA and the peripheral area PA outside the display area DA. The substrate 200 may include various flexible and/or bendable materials. For example, the substrate 200 may include glass, metal, and/or polymer resin. Also, the substrate 200 may include polymer resin such as polyethersulfone, polyacrylate, polyetherimide, polyethylene naphthalate, polyethylene terephthalate, polyphenylene sulfide, polyarylate, polyimide, polycarbonate, and/or cellulose acetate propionate. Various modifications may be made. For example, the substrate 200 may have a multilayer structure including two layers each including polymer resin, and a barrier layer between the two layers, the barrier layer including an inorganic material (e.g., silicon oxide, silicon nitride, and/or silicon oxynitride).

A buffer layer 201 may be disposed on the substrate 200. The buffer layer 201 may function as a barrier layer and/or a blocking layer to prevent diffusion of impurity ions, prevent penetration of moisture and/or external air, and flatten the surface. The buffer layer 201 may include silicon oxide, silicon nitride, and/or silicon oxynitride. Also, the buffer layer 201 may be configured to adjust the speed of providing heat during a crystallization process to form a first semiconductor layer 210 such that the first semiconductor layer 210 may be evenly crystallized.

The first semiconductor layer 210 may be disposed on the buffer layer 201. The first semiconductor layer 210 may include polysilicon and may include a channel region that is not doped with impurities, and a source region and a drain region that are on both sides of the channel region and formed by doping impurities. In this case, the impurities may vary depending on the type of TFT and may include N-type impurities and/or P-type impurities.

A first gate insulating layer 202 may be disposed on the first semiconductor layer 210 and the buffer layer 201. The first gate insulating layer 202 may be configured to ensure insulation between the first semiconductor layer 210 and a first gate layer 220 to be described below. The first gate insulating layer 202 may include an inorganic material such as silicon oxide, silicon nitride, and/or silicon oxynitride and may be between the first semiconductor layer 210 and the first gate layer 220 to be described below. Also, the first gate insulating layer 202 may have a shape corresponding to the entire surface of the substrate 200 and may also have a structure in which contact holes are formed in preset portions. As described above, an insulating layer including an inorganic material may be formed by using chemical vapor deposition (CVD) and/or atomic layer deposition (ALD). This applies to the following embodiments and modifications thereof.

The first gate layer 220 may be disposed on the first gate insulating layer 202. The first gate layer 220 may be arranged at a position where the first gate layer 220 vertically overlaps the first semiconductor layer 210, and may include at least one metal from among molybdenum (Mo), aluminum (Al), platinum (Pt), palladium (Pd), silver (Ag), magnesium (Mg), gold (Au), nickel (Ni), neodymium (Nd), iridium (Ir), chromium (Cr), lithium (Li), calcium (Ca), titanium (Ti), tungsten (W), and/or copper (Cu).

A first interlayer insulating layer 203 may be disposed on the first gate layer 220 and the first gate insulating layer 202. The first interlayer insulating layer 203 may cover the first gate layer 220. The first interlayer insulating layer 203 may include an inorganic material. For example, the first interlayer insulating layer 203 may include metal oxide and/or metal nitride, and in detail, the organic material may include silicon oxide ($SiO_2$), silicon nitride ($SiN_x$), silicon oxynitride (SiON), aluminum oxide ($Al_2O_3$), titanium oxide ($TiO_2$), tantalum oxide ($Ta_2O_5$), hafnium oxide ($HfO_2$), and/or zinc oxide ($ZrO_2$). In one or more embodiments, the first interlayer insulating layer 203 may have a dual structure of $SiO_x/SiN_y$ and/or $SiN_x/SiO_y$.

A second gate layer 230 may be disposed on the first interlayer insulating layer 203. In some cases, the second gate layer 230 may be omitted. The second gate layer 230 may be arranged at a position where the second gate layer 230 vertically overlaps the first gate layer 220 (e.g., in a z-direction or a thickness direction of the substrate 200).

The second gate layer 230 may include Mo, Al, Pt, Pd, Ag, Mg, Au, Ni, Nd, Ir, Cr, Li, Ca, Ti, W, and/or Cu.

In some cases, the second gate layer 230 may form a storage capacitor with the first gate layer 220. The first gate layer 220 may include a first electrode of the storage capacitor, and the second gate layer 230 may include a second electrode of the storage capacitor.

A second interlayer insulating layer 204 may be disposed on the second gate layer 230 and the first interlayer insulating layer 203. The second interlayer insulating layer 204 may cover the second gate layer 230. The second interlayer insulating layer 204 may include an inorganic material. For example, the second interlayer insulating layer 204 may include metal oxide and/or metal nitride, and in detail, the organic material may include $SiO_2$, $SiN_x$, SiON, $Al_2O_3$, $TiO_2$, $Ta_2O_5$, $HfO_2$, and/or $ZrO_2$. In one or more embodiments, the second interlayer insulating layer 204 may have a dual structure of $SiO_x/SiN_y$ and/or $SiN_x/SiO_y$.

A second semiconductor layer 240 may be disposed on the second interlayer insulating layer 204. The second semiconductor layer 240 may include polysilicon and/or silicon oxide and may mainly include silicon oxide. The second semiconductor layer 240 may include a channel region that is not doped with impurities, and a source region and a drain region that are on both sides of the channel region and formed by doping impurities. In this case, the impurities may vary depending on the type of TFT and may include N-type impurities and/or P-type impurities.

A second gate insulating layer 205 may be disposed on the second semiconductor layer 240 and the second interlayer insulating layer 204. The second gate insulating layer 205 may be configured to ensure insulation between the second semiconductor layer 240 and a gate layer to be described below. The second gate insulating layer 205 may include an inorganic material such as silicon oxide, silicon nitride, and/or silicon oxynitride and may be between the second semiconductor layer 240 and a third gate layer 250 to be described below. Also, the second gate insulating layer 205 may have a shape corresponding to the entire surface of the substrate 200 and may also have a structure in which contact holes are formed in preset portions. As described above, an insulating layer including an inorganic material may be formed by using CVD and/or ALD. This applies to the following embodiments and modifications thereof.

The third gate layer 250 may be disposed on the second gate insulating layer 205. The third gate layer 250 may be arranged at a position where the third gate layer 250 vertically overlaps the second semiconductor layer 240 (e.g., in the z-direction or the thickness direction of the substrate 200), and may include Mo, Al, Pt, Pd, Ag, Mg, Au, Ni, Nd, Ir, Cr, Li, Ca, Ti, W, and/or Cu.

A third interlayer insulating layer 206 may be disposed on the third gate layer 250 and the second gate insulating layer 205. The third interlayer insulating layer 206 may cover the third gate layer 250. The third interlayer insulating layer 206 may include an inorganic material. For example, the third interlayer insulating layer 206 may include metal oxide and/or metal nitride, and in detail, the organic material may include $SiO_2$, $SiN_x$, SiON, $Al_2O_3$, $TiO_2$, $Ta_2O_5$, $HfO_2$, and/or $ZrO_2$. In one or more embodiments, the third interlayer insulating layer 206 may have a dual structure of $SiO_x/SiN_y$ or $SiN_x/SiO_y$.

A fourth gate layer 260 may be disposed on the third interlayer insulating layer 206. In some cases, the fourth gate layer 260 may be omitted.

The fourth gate layer 260 may be arranged at a position where the fourth gate layer 260 vertically overlaps the third gate layer 250 (e.g., in the z-direction or the thickness direction of the substrate 200), and may include Mo, Al, Pt, Pd, Ag, Mg, Au, Ni, Nd, Ir, Cr, Li, Ca, Ti, W, and/or Cu.

In some cases, the fourth gate layer 260 may form a storage capacitor with the third gate layer 250. The fourth gate layer 260 may include a first electrode of the storage capacitor, and the third gate layer 250 may include a second electrode of the storage capacitor.

A fourth interlayer insulating layer 207 may be disposed on the fourth gate layer 260 and the third interlayer insulating layer 206. The fourth interlayer insulating layer 207 may cover the fourth gate layer 260. The fourth interlayer insulating layer 207 may include an inorganic material. For example, the fourth interlayer insulating layer 207 may include metal oxide and/or metal nitride, and in detail, the organic material may include $SiO_2$, $SiN_x$, SiON, $Al_2O_3$, $TiO_2$, $Ta_2O_5$, $HfO_2$, and/or $ZrO_2$. In one or more embodiments, the fourth interlayer insulating layer 207 may have a dual structure of $SiO_x/SiN_y$ or $SiN_x/SiO_y$.

A first conductive layer 270 may be located over the fourth interlayer insulating layer 207. The first conductive layer 270 may function as an electrode connected to the source/drain region of the first semiconductor layer 210 through a through hole passing through the first gate insulating layer 202 to the fourth interlayer insulating layer 207.

The first conductive layer 270 may function as an electrode connected to the source/drain area of the second semiconductor layer 240 through a through hole passing through the second gate insulating layer 205 to the fourth interlayer insulating layer 207.

The first conductive layer 270 may include Al, Pt, Pd, Ag, Mg, Au, Ni, Nd, Ir, Cr, Li, Ca, Mo, Ti, W, and/or Cu. For example, the first conductive layer 270 may include a Ti layer, an Al layer, and/or a Cu layer.

The first conductive layer 270 may form at least some of data lines and/or wires to be described below. Also, FIGS. 4-13, which are described below, show planar data lines/wires for convenience of description, and the data lines/wires may include the first conductive layer 270.

A first organic insulating layer 208*a* may be disposed on the first conductive layer 270 and the fourth interlayer insulating layer 207. The first organic insulating layer 208*a* covers the upper portion of the first conductive layer 270 and has a generally flat top surface, and thus may function as a planarization layer. The first organic insulating layer 208*a* may include an organic material such as acryl, benzocyclobutene (BCB), and/or hexamethyldisiloxane (HMDSO). Various modifications may be made. The first organic insulating layer 208*a* may include a single layer or a multilayer.

A second conductive layer 280 may be located over the first organic insulating layer 208*a*. The second conductive layer 280 may function as an electrode connected to a source/drain area of a semiconductor layer (e.g., 210 or 240) through a through hole included in the first organic insulating layer 208*a* to be connected to the first conductive layer 270. The second conductive layer 280 may include Al, Pt, Pd, Ag, Mg, Au, Ni, Nd, Ir, Cr, Li, Ca, Mo, Ti, W, and/or Cu. For example, the second conductive layer 280 may include a Ti layer, an Al layer, and/or a Cu layer.

The first conductive layer 270 and the second conductive layer 280 may be at least some of data lines and/or wires to be described below. Also, FIGS. 4-13, which are described below, show planar data lines/wires for convenience of description, and the data lines/wires may include the first conductive layer 270 and the second conductive layer 280.

A second organic insulating layer 208*b* may be disposed on the first conductive layer 270 and the first organic insulating layer 208*a*. The second organic insulating layer 208*b* covers the upper portion of the second conductive layer 280 and has a generally flat top surface, and thus may function as a planarization layer. The second organic insulating layer 208*b* may include an organic material such as acryl, BCB, and/or HMDSO. Various modifications may be made. The second organic insulating layer 208*b* may include a single layer or a multilayer.

Also, in one or more embodiments, an additional conductive layer and an additional insulating layer may be between a conductive layer and a pixel electrode, and may be applied in various embodiments. In this case, the additional conductive layer may include the same material and have the same layer structure as the aforementioned conductive layer. The additional insulating layer may include the same material and have the same layer structure as the aforementioned organic insulating layer.

A pixel electrode 290 may be disposed on the second organic insulating layer 208*b*. The pixel electrode 290 may be connected to the second conductive layer 280 through a contact hole formed in the second organic insulating layer 208*b*. A display element may be disposed on the pixel electrode 290. An OLED may be used as the display element. That is, the OLED may be disposed on, for example, the pixel electrode 290. The pixel electrode 290 may include a light-transmissive conductive layer and a reflective layer, the light-transmissive conductive layer including a light-transmissive conductive oxide such as indium tin oxide (ITO), indium oxide ($In_2O_3$), and/or indium zinc oxide (IZO), and/or the reflective layer including metal such as Al and/or Ag. For example, the pixel electrode 290 may have a three-layer structure of ITO/Ag/ITO.

A pixel-defining layer 209 may be disposed on the second organic insulating layer 208*b* and may be arranged to cover edges of the pixel electrode 290. That is, the pixel-defining layer 209 may cover the edges of the pixel electrode 290. The pixel-defining layer 209 may have an opening corresponding to the pixel PX, and the opening may be formed to expose at least a central portion of the pixel electrode 290. The pixel-defining layer 209 may include, for example, an organic material such as polyimide and/or HMDSO.

An intermediate layer 295 and an opposite electrode 296 may be arranged over the opening of the pixel-defining layer 209. The intermediate layer 295 may include a low molecular weight material and/or a polymer material. When the intermediate layer 295 includes the low molecular weight material, the intermediate layer 295 may include a hole injection layer, a hole transport layer, an emission layer, an electron transport layer, and/or an electron injection layer. When the intermediate layer 295 includes the polymer material, the intermediate layer 295 may generally have a structure including a hole transport layer and/or an emission layer.

The opposite electrode 296 may include a light-transmissive conductive layer including a light-transmissive conductive oxide such as ITO, $In_2O_3$, and/or IZO. The pixel electrode 290 is used as an anode, and the opposite electrode 296 is used as a cathode. The polarity of the electrodes may be applied in reverse.

The structure of the intermediate layer 295 is not limited to the above and may have various structures. For example, at least one of the layers forming the intermediate layer 295 may be formed as a single body with the opposite electrode 296. In one or more embodiments, the intermediate layer 295 may include patterned layers respectively corresponding to a plurality of pixel electrodes 290.

The opposite electrode 296 may be arranged over the display area DA and may be arranged in front of the display area DA. That is, the opposite electrode 296 may be formed as a single body to cover a plurality of pixels. The opposite electrode 296 may be in electrical contact with a common power supply line arranged in the peripheral area PA. In one or more embodiments, the opposite electrode 296 may extend to a barrier wall.

A protective layer 300 may cover the entire display area DA and may extend to the peripheral area PA to cover at least a portion of the peripheral area PA. The protective layer 300 may be a thin-film encapsulation layer or a layer including a rigid member (e.g., glass).

When the protective layer 300 is the thin-film encapsulation layer, the thin-film encapsulation layer may include a first inorganic encapsulation layer, a second inorganic encapsulation layer, and an organic encapsulation layer therebetween. The first inorganic encapsulation layer and the second inorganic encapsulation layer may include at least one inorganic material from among aluminum oxide, titanium oxide, tantalum oxide, hafnium oxide, zinc oxide, silicon oxide, silicon oxynitride, and/or silicon nitride.

The first inorganic encapsulation layer and the second inorganic encapsulation layer may include a single layer or a multilayer including the aforementioned material. The first inorganic encapsulation layer and the second inorganic encapsulation layer may include the same material or different materials. The first inorganic encapsulation layer and the second inorganic encapsulation layer may have different thicknesses. A thickness of the first inorganic encapsulation layer may be greater than a thickness of the second inorganic encapsulation layer. Alternatively, the thickness of the second inorganic encapsulation layer may be greater than the thickness of the first inorganic encapsulation layer, and the first inorganic encapsulation layer and the second inorganic encapsulation layer may have the same thickness.

The organic encapsulation layer may include a monomer-based material and/or a polymer-based material. The polymer-based material may include acrylic resin, epoxy-based resin, polyimide, and/or polyethylene. In one or more embodiments, the organic encapsulation layer may include acrylate.

As shown in FIG. 3, a first-1 thin-film transistor TFT1-1 and a first-2 thin-film transistor TFT1-2 may be arranged to implement the pixel circuit in the display area DA. The first-1 thin-film transistor TFT1-1 may refer to a transistor structure configured around the first semiconductor layer 210, and the first-2 thin-film transistor TFT1-2 may refer to a transistor structure configured around the second semiconductor layer 240.

Figure 4:
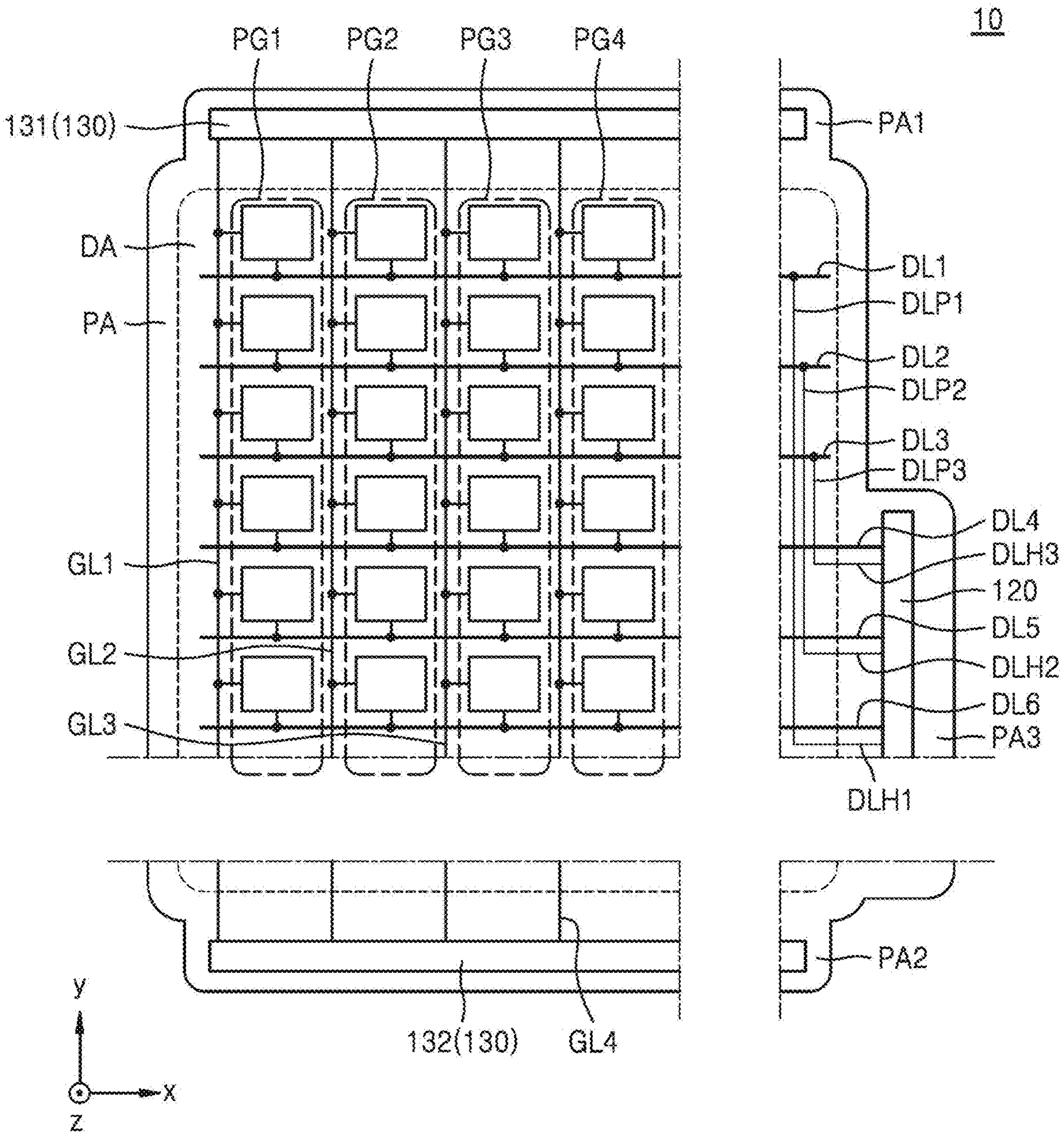
FIG. 4 is a schematic plan view illustrating an example of the display panel of FIG. 1.

FIG. 4 is a schematic plan view illustrating an example of the display panel 10 of FIG. 1.

For reference, descriptions of FIG. 4, which are substantially the same as those described above, may be omitted.

According to one or more embodiments, the display apparatus may include the substrate 200 (see FIG. 3, hereinafter the same), a gate driver 130, a data driver 120, the pixels PX, a data line, a scan line, a vertical data line, and a horizontal data line.

The substrate 200 may include the display area DA and the peripheral area PA arranged around the display area DA. The peripheral area PA may include a first peripheral area PA1 and a second peripheral area PA2, the first peripheral area PA1 being on one side of the display area DA, and the second peripheral area PA2 being on the other side of the display area DA. In a plan view, the display area DA may be between the first peripheral area PA1 and the second peripheral area PA2.

The gate driver 130 may include a first gate driver 131 and a second gate driver 132. As described above, a method in which the gate driver 130 is arranged on each side of the display area DA may be referred to as a double-side driving method.

In the display apparatus using the double-side driving method, the first gate driver 131 may be arranged in the first peripheral area PA1, and the second gate driver 132 may be arranged in the second peripheral area PA2. The first gate driver 131 and the second gate driver 132 may be connected to both sides of the scan line.

When the display apparatus according to one or more embodiments includes a flexible display panel, the gate driver 130 may be arranged to avoid a bent area of the first peripheral area PA1. For example, a portion of the first peripheral area PA1 may be a bending area, and other portions of the first peripheral area PA1 may be a non-bending area. In this case, the gate driver 130 may be arranged in the non-bending area. The description of the gate driver 130 may also be applied to the first gate driver 131 and the second gate driver 132.

When the display apparatus according to one or more embodiments includes a rigid display panel, the gate driver 130 may be implemented as a gate driver IC and may use a chip-on-flex (COF) packaging method. As the COF packaging method is used, the area of the first peripheral area PA1 may be reduced. The description of the gate driver 130 may also be applied to the first gate driver 131 and the second gate driver 132.

The substrate 200 may further include a third peripheral area PA3 on another side of the display area DA. The data driver 120 may be arranged in the third peripheral area PA3. The data driver 120 may be connected to one side of the data line.

The scan line may include a plurality of scan lines including a first scan line GL1, a second scan line GL2, a third scan line GL3, and a fourth scan line GL4. As shown in FIG. 2, for example, the first, second, third, and fourth scan lines GL1, GL2, GL3, and GL4, extend in the x-axis direction. In one or more embodiments, in a plan view, the scan line may extend substantially in the y-axis direction.

The data line may include a plurality of data lines including a first data line DL1, a second data line DL2, a third data line DL3, a fourth data line DL4, a fifth data line DL5, and a sixth data line DL6. In one or more embodiments, in a plan view, the data line may extend substantially in an x-axis direction. Some of the plurality of data lines may be directly connected to the data driver 120. Others of the plurality of data lines may be electrically connected to the data driver 120 through a vertical data line and/or a horizontal data line. In a plan view, the vertical data line may extend substantially in the y-axis direction. In a plan view, the horizontal data line may extend substantially in the x-axis direction.

For example, the fourth data line DL4, the fifth data line DL5, and the sixth data line DL6 may be directly connected to the data driver 120.

For example, the first data line DL1 may be connected to a first vertical data line DLP1. In a plan view, the first vertical data line DLP1 may extend substantially in the y-axis direction. One end of the first vertical data line DLP1 may be connected to the first data line DL1, and the other end of the first vertical data line DLP1 may be connected to a first horizontal data line DLH1. In a plan view, the first horizontal data line DLH1 may extend substantially in the x-axis direction. The first horizontal data line DLH1 may connect the first vertical data line DLP1 and the data driver 120 to each other.

For example, the second data line DL2 may be connected to a second vertical data line DLP2. In a plan view, the second vertical data line DLP2 may extend substantially in the y-axis direction. One end of the second vertical data line DLP2 may be connected to the second data line DL2, and the other end of the second vertical data line DLP2 may be connected to a second horizontal data line DLH2. In a plan view, the second horizontal data line DLH2 may extend substantially in the x-axis direction. The second horizontal data line DLH2 may connect the second vertical data line DLP2 and the data driver 120 to each other.

For example, the third data line DL3 may be connected to a third vertical data line DLP3. In a plan view, the third vertical data line DLP3 may extend substantially in the y-axis direction. One end of the third vertical data line DLP3 may be connected to the third data line DL3, and the other end of the third vertical data line DLP3 may be connected to a third horizontal data line DLH3. In a plan view, the third horizontal data line DLH3 may extend substantially in the x-axis direction. The third horizontal data line DLH3 may connect the third vertical data line DLP3 and the data driver 120 to each other.

When the display apparatus according to one or more embodiments includes a flexible display panel, the data driver 120 may be arranged to avoid a bent area of the first peripheral area PA1. For example, a portion of the first peripheral area PA1 may be a bending area, and other portions of the first peripheral area PA1 may be a non-bending area. In this case, the data driver 120 may be arranged in the non-bending area.

When the display apparatus according to one or more embodiments includes a rigid display panel, the data driver 120 may be implemented as a data driver IC and may use a COF packaging method. As the COF packaging method is used, the area of the first peripheral area PA1 may be reduced.

As shown in FIG. 4, the display apparatus according to one or more embodiments may include a first pixel group PG1, a second pixel group PG2, a third pixel group PG3, and a fourth pixel group PG4. In one or more embodiments, the display apparatus may further include an n-th pixel group.

The first pixel group PG1 may refer to a plurality of pixels configured to receive scan signals from the gate driver 130 through the first scan line GL1. The second pixel group PG2 may refer to a plurality of pixels configured to receive scan signals from the gate driver 130 through the second scan line GL2. The third pixel group PG3 may refer to a plurality of pixels configured to receive scan signals from the gate driver 130 through the third scan line GL3. The fourth pixel group PG4 may refer to a plurality of pixels configured to receive scan signals from the gate driver 130 through the fourth scan line GL4. The n-th pixel group may refer to a plurality of pixels configured to receive scan signals from the gate driver 130 through an n-th scan line.

In a plan view, the plurality of pixels included in the first pixel group PG1 may be arranged side by side along the y-axis direction along the first scan line GL1. In a plan view, the plurality of pixels included in the second pixel group PG2 may be arranged side by side along the y-axis direction along the second scan line GL2. In a plan view, the plurality of pixels included in the third pixel group PG3 may be arranged side by side along the y-axis direction along the third scan line GL3. In a plan view, the plurality of pixels included in the fourth pixel group PG4 may be arranged side by side along the y-axis direction along the fourth scan line GL4. In a plan view, the plurality of pixels included in the n-th pixel group may be arranged side by side along the y-axis direction along the n-th scan line.

For example, in a plan view, the second pixel group PG2 may be between the first pixel group PG1 and the third pixel group PG3. In a plan view, the third pixel group PG3 may be between the second pixel group PG2 and the fourth pixel group PG4.

For example, in a plan view, the second scan line GL2 may be between the first scan line GL1 and the third scan line GL3. In a plan view, the third scan line GL3 may be between the second scan line GL2 and the fourth scan line GL4.

For example, in a plan view, the second data line DL2 may be between the first data line DL1 and the third data line DL3. In a plan view, the third data line DL3 may be between the second data line DL2 and the fourth data line DL4.

For example, in a plan view, the second vertical data line DLP2 may be between the first vertical data line DLP1 and the third vertical data line DLP3. In a plan view, the second horizontal data line DLH2 may be between the first horizontal data line DLH1 and the third horizontal data line DLH3.

Figure 5:
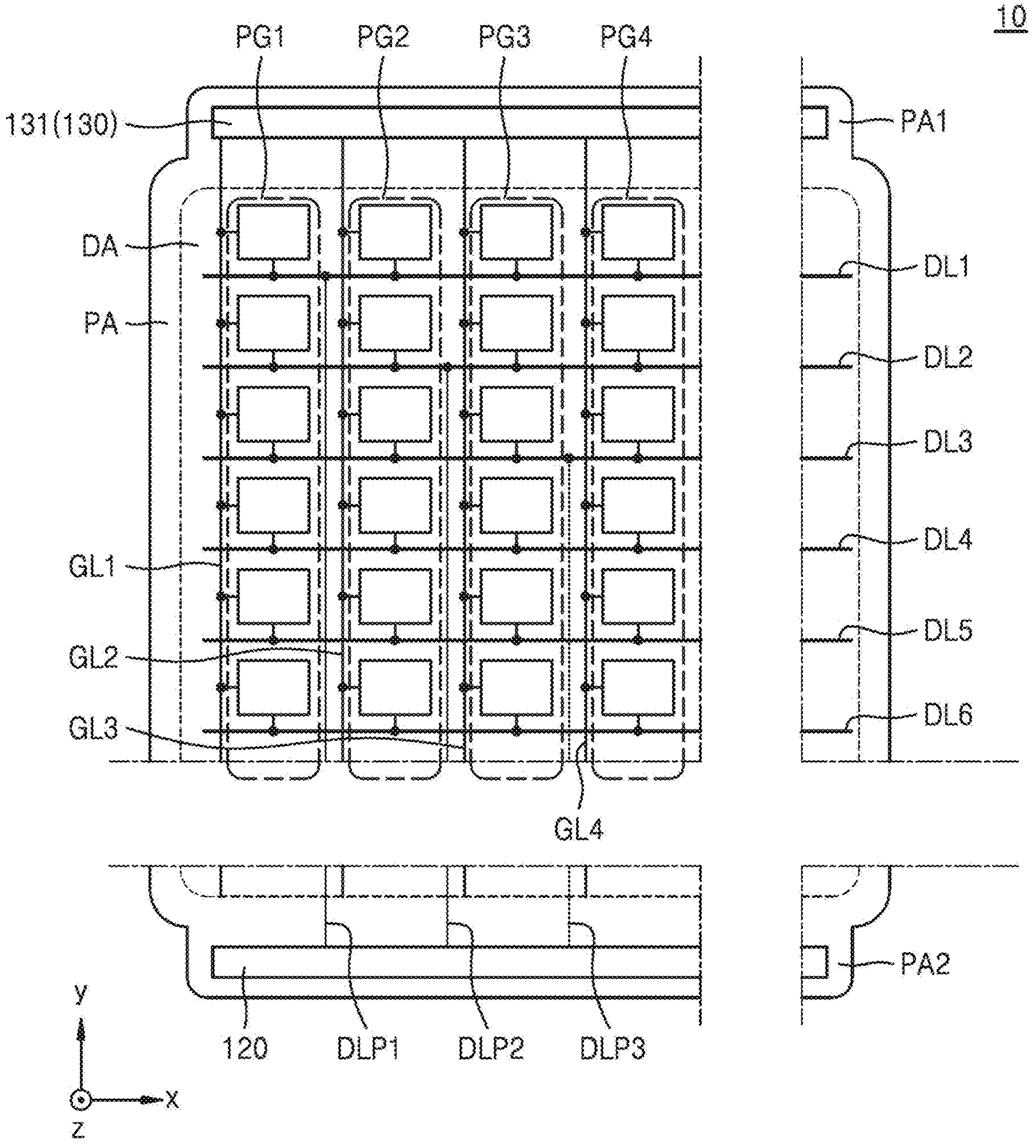
FIG. 5 is a schematic plan view illustrating an example of the display panel of FIG. 1.

FIG. 5 is a schematic plan view illustrating an example of the display panel 10 of FIG. 1.

For reference, descriptions of FIG. 5, which are substantially the same as those described above, may be omitted.

According to one or more embodiments, the display apparatus may include the substrate 200, the gate driver 130, the data driver 120, the pixels PX, a data line, a scan line, and a vertical data line.

As described above, the peripheral area PA may include the first peripheral area PA1 and the second peripheral area PA2, the first peripheral area PA1 being on one side of the display area DA, and the second peripheral area PA2 being on the other side of the display area DA. In a plan view, the display area DA may be between the first peripheral area PA1 and the second peripheral area PA2.

The gate driver 130 may be implemented with only the first gate driver 131. As described above, a method in which the first gate driver 131 is arranged on one side of the display area DA and the second gate driver 132 is not included may be referred to as a one-side driving method.

In the display apparatus using the one-side driving method, the first gate driver 131 may be arranged in the first peripheral area PA1, and the data driver 120 may be arranged in the second peripheral area PA2. The first gate driver 131 may be connected to one side of the scan line.

The data line may include a plurality of data lines including the first data line DL1, the second data line DL2, the third data line DL3, the fourth data line DL4, the fifth data line DL5, and the sixth data line DL6. Due to the positional characteristics of the data driver 120, the plurality of data lines are not directly connected to the data driver 120. The data line may be electrically connected to the data driver 120 through the vertical data line.

For example, the first data line DL1 may be connected to the first vertical data line DLP1. In a plan view, the first vertical data line DLP1 may extend substantially in the y-axis direction. One end of the first vertical data line DLP1 may be connected to the first data line DL1, and the other end of the first vertical data line DLP1 may be connected to the data driver 120 of the second peripheral area PA2.

For example, the second data line DL2 may be connected to the second vertical data line DLP2. In a plan view, the second vertical data line DLP2 may extend substantially in the y-axis direction. One end of the second vertical data line DLP2 may be connected to the second data line DL2, and the other end of the second vertical data line DLP2 may be connected to the data driver 120 of the second peripheral area PA2.

For example, the third data line DL3 may be connected to the third vertical data line DLP3. In a plan view, the third vertical data line DLP3 may extend substantially in the y-axis direction. One end of the third vertical data line DLP3 may be connected to the third data line DL3, and the other end of the third vertical data line DLP3 may be connected to the data driver 120 of the second peripheral area PA2.

As shown in FIG. 5, the display apparatus according to one or more embodiments may include the first pixel group PG1, the second pixel group PG2, the third pixel group PG3, and the fourth pixel group PG4. In one or more embodiments, the display apparatus may further include the n-th pixel group. Descriptions of the pixel groups may be replaced with those provided above with reference to FIG. 4.

For example, in a plan view, the second pixel group PG2 may be between the first pixel group PG1 and the third pixel group PG3. In a plan view, the third pixel group PG3 may be between the second pixel group PG2 and the fourth pixel group PG4.

For example, in a plan view, the second scan line GL2 may be between the first scan line GL1 and the third scan line GL3. In a plan view, the third scan line GL3 may be between the second scan line GL2 and the fourth scan line GL4.

For example, in a plan view, the second data line DL2 may be between the first data line DL1 and the third data line DL3. In a plan view, the third data line DL3 may be between the second data line DL2 and the fourth data line DL4. In a plan view, an n-th data line may be between a (n−1)-th data line and a (n+1)-th data line.

For example, in a plan view, the second vertical data line DLP2 may be between the first vertical data line DLP1 and the third vertical data line DLP3.

Figure 6:
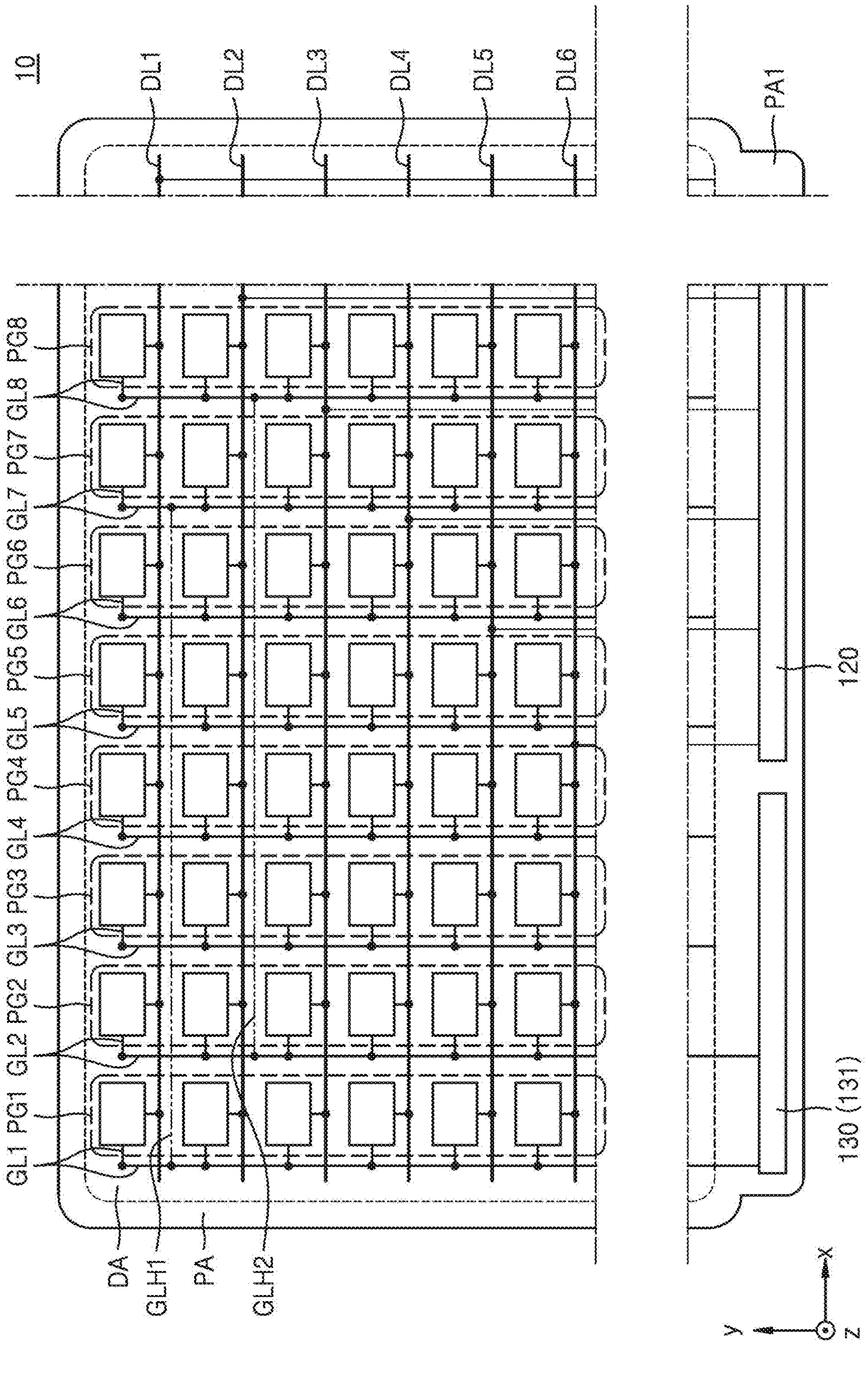
FIG. 6 is a schematic plan view illustrating an example of the display panel of FIG. 1.

FIG. 6 is a schematic plan view illustrating an example of the display panel 10 of FIG. 1.

For reference, descriptions of FIG. 6, which are substantially the same as those described above, may be omitted.

According to one or more embodiments, the display apparatus may include the substrate 200, the gate driver 130, the data driver 120, the pixels PX, a data line, a scan line, a vertical data line, and a vertical scan line.

The gate driver 130 may be implemented with only the first gate driver 131. As described above, a method in which the first gate driver 131 is included while the second gate driver 132 is not included may be referred to as a one-side driving method.

The first gate driver 131 and the data driver 120 may be arranged in the first peripheral area PA1. In a plan view, the first gate driver 131 and the data driver 120 may be arranged to be spaced (e.g., spaced apart) from each other in the x-axis direction.

The scan line may include a plurality of scan lines including the first scan line GL1 to an eighth scan line GL8. In a plan view, the scan line may extend substantially in the y-axis direction. Some of the plurality of scan lines may be directly connected to the first gate driver 131. Other ones of the plurality of scan lines may be electrically connected to some of the plurality of scan lines through the vertical scan line, the plurality of scan lines being directly connected to the first gate driver 131.

For example, the first scan line GL1 may be directly connected to the first gate driver 131. The first scan line GL1 may be electrically connected to another scan line through a first horizontal scan line GLH1. For example, the first scan line GL1 may be electrically connected to the third scan line GL3 through the first horizontal scan line GLH1. The first scan line GL1 may be electrically connected to the fifth scan line GL5 through the first horizontal scan line GLH1. The first scan line GL1 may be electrically connected to the seventh scan line GL7 through the first horizontal scan line GLH1. In a plan view, the first horizontal scan line GLH1 may extend in the x-axis direction, may be connected to the first scan line GL1, and may be electrically connected to at least one of the third scan line GL3, the fifth scan line GL5, and the seventh scan line GL7.

For example, the second scan line GL2 may be directly connected to the first gate driver 131. The second scan line GL2 may be electrically connected to another scan line through a second horizontal scan line GLH2. For example, the second scan line GL2 may be electrically connected to the fourth scan line GL4 through the second horizontal scan line GLH2. The second scan line GL2 may be electrically connected to the sixth scan line GL6 through the second horizontal scan line GLH2. The second scan line GL2 may be electrically connected to the eighth scan line GL8 through the second horizontal scan line GLH2. In a plan view, the second horizontal scan line GLH2 may extend in the x-axis direction, may be connected to the second scan line GL2, and may be electrically connected to at least one of the fourth scan line GL4, the sixth scan line GL6, and the eighth scan line GL8.

The data line may include a plurality of data lines including a first data line DL1, a second data line DL2, a third data line DL3, a fourth data line DL4, a fifth data line DL5, and a sixth data line DL6. In a plan view, the data line may extend substantially in the x-axis direction. The plurality of data lines may be electrically connected to the data driver 120 through a vertical data line and/or a horizontal data line. In a plan view, the vertical data line may extend substantially in the y-axis direction. In a plan view, the horizontal data line may extend substantially in the x-axis direction.

For example, the first data line DL1 may be connected to the first vertical data line DLP1 (e.g., see FIG. 4). In a plan view, the first vertical data line DLP1 may extend substantially in the y-axis direction. In one or more embodiments, one end of the first vertical data line DLP1 may be connected to the first data line DL1, and the other end of the first vertical data line DLP1 may be connected to the data driver 120 of the first peripheral area PA1.

For example, the second data line DL2 may be connected to the second vertical data line DLP2. In a plan view, the second vertical data line DLP2 may extend substantially in the y-axis direction (e.g., see FIG. 4). In one or more embodiments, one end of the second vertical data line DLP2 may be connected to the second data line DL2, and the other end of the second vertical data line DLP2 may be connected to the data driver 120 of the first peripheral area PA1.

For example, the third data line DL3 may be connected to the third vertical data line DLP3 (e.g., see FIG. 4). In a plan view, the third vertical data line DLP3 may extend substantially in the y-axis direction. In one or more embodiments, one end of the third vertical data line DLP3 may be connected to the third data line DL3, and the other end of the third vertical data line DLP3 may be connected to the data driver 120 of the first peripheral area PA1.

For convenience of description, the example has been mainly described about the vertical data lines, but horizontal data lines may be further included according to the position of the data driver 120, the arrangement of data lines, etc.

As shown in FIG. 6, the display apparatus according to one or more embodiments may include the first pixel group PG1 to an eighth pixel group PG8. In one or more embodiments, the display apparatus may further include the n-th pixel group. For reference, descriptions of the first pixel group PG1 to the fourth pixel group PG4 may be replaced with those provided above with reference to FIG. 4.

The fifth pixel group PG5 may refer to a plurality of pixels configured to receive scan signals from the gate driver 130 through the fifth scan line GL5. The sixth pixel group PG6 may refer to a plurality of pixels configured to receive scan signals from the gate driver 130 through the sixth scan line GL6. The seventh pixel group PG7 may refer to a plurality of pixels configured to receive scan signals from the gate driver 130 through the seventh scan line GL7. The eighth pixel group PG8 may refer to a plurality of pixels configured to receive scan signals from the gate driver 130 through the eighth scan line GL8. The n-th pixel group may refer to a plurality of pixels configured to receive scan signals from the gate driver 130 through the n-th scan line.

In a plan view, the plurality of pixels included in the fifth pixel group PG5 may be arranged side by side along the y-axis direction along the fifth scan line GL5. In a plan view, the plurality of pixels included in the sixth pixel group PG6 may be arranged side by side along the y-axis direction along the sixth scan line GL6. In a plan view, the plurality of pixels included in the seventh pixel group PG7 may be arranged side by side along the y-axis direction along the seventh scan line GL7. In a plan view, the plurality of pixels included in the eighth pixel group PG8 may be arranged side by side along the y-axis direction along the eighth scan line GL8. In a plan view, the plurality of pixels included in the n-th pixel group may be arranged side by side in the y-axis direction along the n-th scan line.

For example, in a plan view, the n-th pixel group may be between a (n−1)-th pixel group and a (n+1)-th pixel group. For example, in a plan view, the n-th scan line may be between a (n−1)-th scan line and a (n+1)-th scan line. For example, in a plan view, the n-th data line may be between the (n−1)-th data line and the (n+1)-th data line. For example, in a plan view, an n-th vertical data line may be between a (n−1)-th vertical data line and a (n+1)-th vertical data line. For example, in a plan view, an n-th horizontal scan line may be between a (n−1)-th horizontal scan line and a (n+1)-th horizontal scan line.

Figure 7:
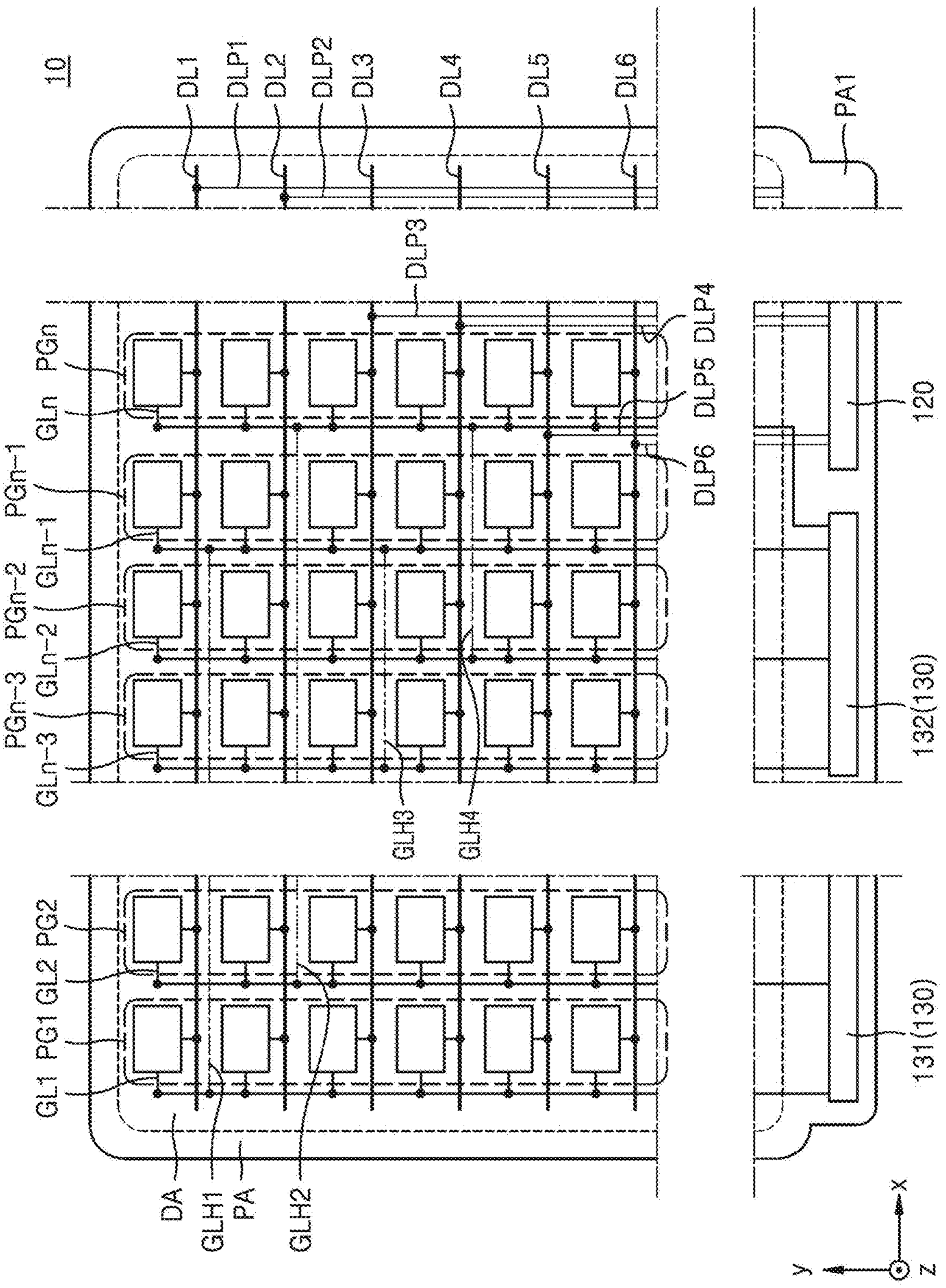
FIG. 7 is a schematic plan view illustrating an example of the display panel of FIG. 1.

FIG. 7 is a schematic plan view illustrating an example of the display panel 10 of FIG. 1.

For reference, descriptions of FIG. 7, which are substantially the same as those described above, may be omitted.

According to one or more embodiments, the display apparatus may include the substrate 200, the gate driver 130, the data driver 120, the pixels PX, a data line, a scan line, a vertical data line, and a vertical scan line.

In one or more embodiments, the gate driver 130 may be implemented with only the first gate driver 131. As described above, a method in which the first gate driver 131 and the second gate driver 132 are included may be referred to as a double-side driving method.

As shown in FIG. 7, the first gate driver 131, the second gate driver 132, and the data driver 120 may be arranged in the first peripheral area PA1. In a plan view, the first gate driver 131, the second gate driver 132, and the data driver 120 may be arranged to be spaced (e.g., spaced apart) from each other in the x-axis direction.

The scan line may include a plurality of scan lines including the first scan line GL1 to the eighth scan line GL8. In a plan view, the scan line may extend substantially in the y-axis direction. Some of the plurality of scan lines may be directly connected to the first gate driver 131. Other ones of the plurality of scan lines may be directly connected to the second gate driver 132. The some of the plurality of scan lines directly connected to the first gate driver 131 and the other ones of the plurality of scan lines directly connected to the second gate driver 132 may be respectively connected to each other through horizontal scan lines.

For example, the first scan line GL1 and the second scan line GL2 may be directly connected to the first gate driver 131. The first scan line GL1 may be electrically connected to another scan line through the first horizontal scan line GLH1, and the second scan line GL2 may be electrically connected to another scan line through the second horizontal scan line GLH2. For example, the first scan line GL1 may be electrically connected to the (n−1)-th scan line through the first horizontal scan line GLH1. The second scan line GL2 may be electrically connected to the n-th scan line GLn through the second horizontal scan line GLH2. The (n−1)-th scan line may be electrically connected to a (n−3)-th scan line through a third horizontal scan line GLH3. The n-th scan line GLn may be electrically connected to a (n−2)-th scan line through a fourth horizontal scan line GLH4.

The data line may include a plurality of data lines including the first data line DL1, the second data line DL2, the third data line DL3, the fourth data line DL4, the fifth data line DL5, and the sixth data line DL6. The data lines may be electrically connected to the data driver 120 through a vertical data line and/or a horizontal data line.

As shown in FIG. 7, the display apparatus according to one or more embodiments may include the first pixel group PG1, the second pixel group PG2, a (n−3)-th pixel group PGn−3, a (n−2)-th pixel group PGn−2, a (n−1)-th pixel group PGn−1, and an n-th pixel group PGn. For reference, descriptions of the first pixel group PG1 and the second pixel group PG2 may be replaced with those provided above with reference to FIG. 4.

The (n−3)-th pixel group PGn−3 may refer to a plurality of pixels configured to receive scan signals from the gate driver 130 through a (n−3)-th scan line GLn−3. The (n−2)-th pixel group PGn−2 may refer to a plurality of pixels configured to receive scan signals from the gate driver 130 through a (n−2)-th scan line GLn−2. The (n−1)-th pixel group PGn−1 may refer to a plurality of pixels configured to receive scan signals from the gate driver 130 through a (n−1)-th scan line GLn−1. The n-th pixel group PGn may refer to a plurality of pixels configured to receive scan signals from the gate driver 130 through the n-th scan line GLn.

In a plan view, the plurality of pixels included in the (n−3)-th pixel group PGn-3 may be arranged side by side along the y-axis direction along the (n−3)-th scan line GLn−3. In a plan view, the plurality of pixels included in the (n−2)-th pixel group PGn−2 may be arranged side by side along the y-axis direction along the (n−2)-th scan line GLn−2. In a plan view, the plurality of pixels included in the (n−1)-th pixel group PGn−1 may be arranged side by side along the y-axis direction along the (n−1)-th scan line GLn−1. In a plan view, the plurality of pixels included in the n-th pixel group PGn may be arranged side by side along the y-axis direction along the n-th scan line GLn.

For example, in a plan view, the (n−1)-th pixel group PGn−1 may be between the (n−2)-th pixel group PGn−2 and the n-th pixel group PGn. For example, in a plan view, the (n−1)-th scan line GLn−1 may be between the (n−2)-th scan line GLn−2 and the n-th scan line GLn. For example, in one or more embodiments in a plan view, the n-th data line may be between the (n−1)-th data line and the (n+1)-th data line. For example, in one or more embodiments in a plan view, the n-th vertical data line may be between the (n−1)-th vertical data line and the (n+1)-th vertical data line. For example, in one or more embodiments in a plan view, the n-th horizontal scan line may be between the (n−1)-th horizontal scan line and the (n+1)-th horizontal scan line.

Figure 8:
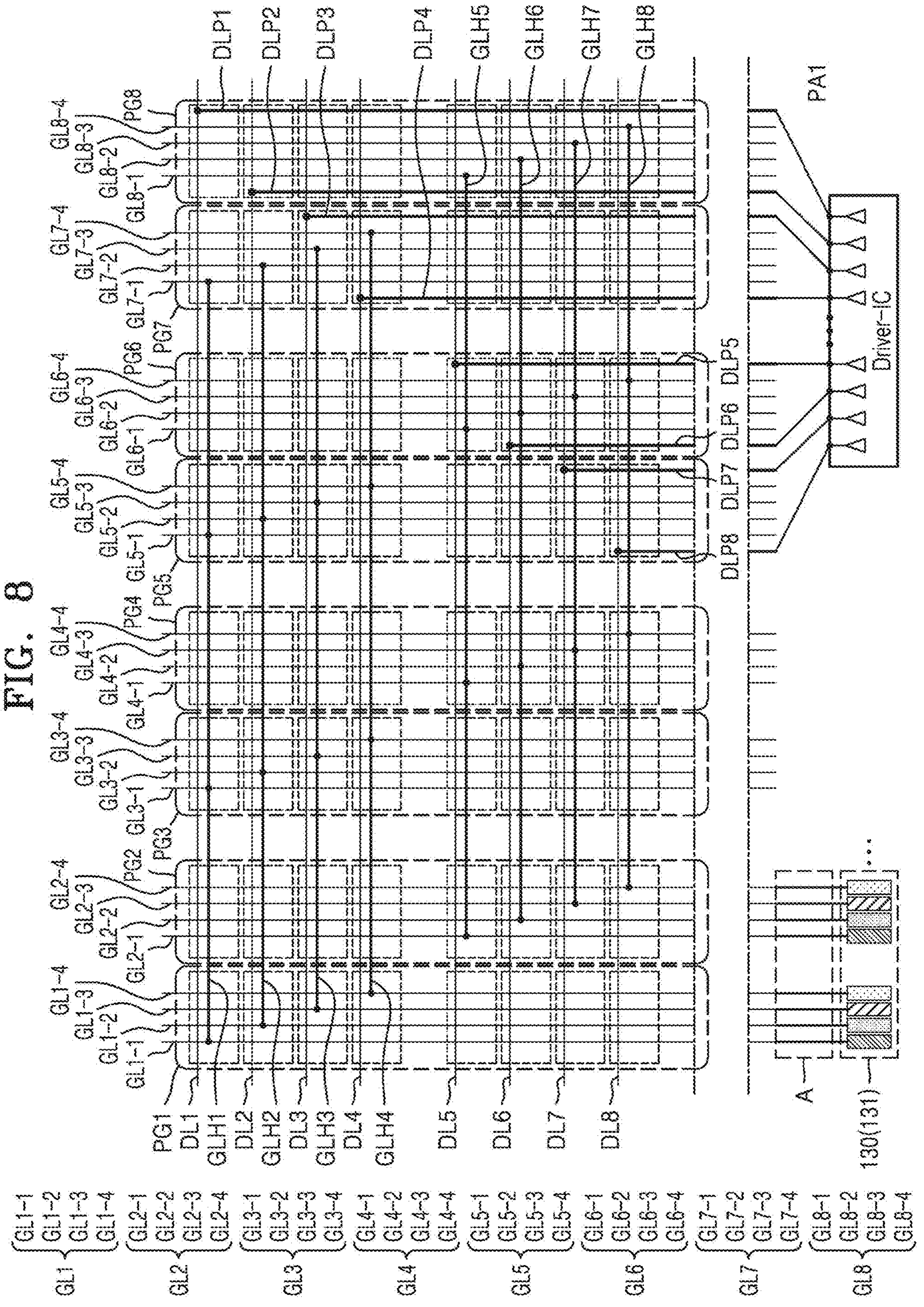
FIG. 8 is a schematic plan view illustrating an example of the display panel of FIG. 1.

FIG. 8 is a schematic plan view illustrating an example of the display panel of FIG. 1.

For reference, descriptions of FIG. 8, which are substantially the same as those described above, may be omitted. Also, an example in FIG. 8 shows the arrangement of wires in the example in FIG. 6 in more detail, and descriptions of FIG. 8, which are substantially the same as those described with reference to FIG. 6, may be omitted.

According to one or more embodiments, the display apparatus may include the substrate 200, the gate driver 130, the data driver 120, the pixels PX, a data line, a scan line, a vertical data line, and a vertical scan line.

As described above, the peripheral area PA may include the first peripheral area PA1 on one side of the display area DA, and the first gate driver 131 and the data driver 120 may be arranged in the first peripheral area PA1 (e.g., see FIG. 6). In a plan view, the first gate driver 131 and the data driver 120 may be arranged to be spaced (e.g., spaced apart) from each other in the x-axis direction.

As shown in FIG. 8, the display apparatus according to one or more embodiments may include the first pixel group PG1 to the eighth pixel group PG8. In one or more embodiments, the display apparatus may further include the n-th pixel group. Descriptions of the first pixel group PG1 to the eighth pixel group PG8 and the n-th pixel group may be replaced with those provided above with reference to FIG. 6.

The first pixel group PG1 may be configured to receive a scan signal from the gate driver 130 through the first scan line GL1, the second pixel group PG2 may be configured to receive a scan signal from the gate driver 130 through the second scan line GL2, the third pixel group PG3 may be configured to receive a scan signal from the gate driver 130 through the third scan line GL3, the fourth pixel group PG4 may be configured to receive a scan signal from the gate driver 130 through the fourth scan line GL4, the fifth pixel group PG5 may be configured to receive a scan signal from the gate driver 130 through the fifth scan line GL5, the sixth pixel group PG6 may be configured to receive a scan signal from the gate driver 130 through the sixth scan line GL6, the seventh pixel group PG7 may be configured to receive a scan signal from the gate driver 130 through the seventh scan line GL7, the eighth pixel group PG8 may be configured to receive a scan signal from the gate driver 130 through the eighth scan line GL8, and the n-th pixel group may be configured to receive a scan signal from the gate driver 130 through the n-th scan line.

The scan lines may include the first scan line GL1 to the eighth scan line GL8, and the scan lines may further include the n-th scan line. The first scan line GL1 may include a first-1 scan line GL1-1, a first-2 scan line GL1-2, a first-3 scan line GL1-3, and a first-4 scan line GL1-4. This is merely an example, and the first scan line GL1 may further include other scan lines.

The scan signals may include a first scan signal, a second scan signal, a third scan signal, a fourth scan signal, and/or an n-th scan signal. For example, the first scan signal may include a first-1 scan signal, a first-2 scan signal, a first-3 scan signal, and a first emission control signal. For example, the second scan signal may include a second-1 scan signal, a second-2 scan signal, a second-3 scan signal, and a second emission control signal. This is merely an example, and each of the first scan signal and the second scan signal may further include other scan signals.

For example, the first-1 scan line GL1-1 may be configured to transmit the first-1 scan signal to the first pixel group PG1. The first-2 scan line GL1-2 may be configured to transmit the first-2 scan signal to the first pixel group PG1. The first-3 scan line GL1-3 may be configured to transmit the first-3 scan signal to the first pixel group PG1. The first-4 scan line GL1-4 may be configured to transmit the first emission control signal to the first pixel group PG1. For example, the first-1 scan line GL1-1 to the first-4 scan line GL1-4 may be directly connected to the first gate driver 131, and the first-1 scan line GL1-1 to the first-4 scan line GL1-4 may be configured to respectively receive the first-1 scan signal to the first-3 scan signal and the first emission control signal from the first gate driver 131.

The second scan line GL2 may include a second-1 scan line GL2-1, a second-2 scan line GL2-2, a second-3 scan line GL2-3, and a second-4 scan line GL2-4. For example, the second-1 scan line GL2-1 may be configured to transmit the second-1 scan signal to the second pixel group PG2. The second-2 scan line GL2-2 may be configured to transmit the second-2 scan signal to the first pixel group PG1. The second-3 scan line GL2-3 may be configured to transmit the second-3 scan signal to the second pixel group PG2. The second-4 scan line GL2-4 may be configured to transmit the second emission control signal to the second pixel group PG2. For example, the second-1 scan line GL2-1 to the second-4 scan line GL2-4 may be directly connected to the first gate driver 131, and the second-1 scan line GL2-1 to the second-4 scan line GL2-4 may be configured to respectively receive the second-1 scan signal to the second-3 scan signal and the second emission control signal from the first gate driver 131.

The third scan line GL3 may include a third-1 scan line GL3-1, a third-2 scan line GL3-2, a third-3 scan line GL3-3, and a third-4 scan line GL3-4. For example, the third-1 scan line GL3-1 may be configured to receive the first-1 scan signal from the first-1 scan line GL1-1 through the first horizontal scan line GLH1. The third-1 scan line GL3-1 may be configured to transmit the first-1 scan signal to the third pixel group PG3.

In a plan view, the first horizontal scan line GLH1 may extend substantially in the x-axis direction. For example, the first horizontal scan line GLH1 may electrically connect the first-1 scan line GL1-1 and the third-1 scan line GL3-1 to each other. For example, the first horizontal scan line GLH1 may electrically connect the first-1 scan line GL1-1, the third-1 scan line GL3-1, a fifth-1 scan line GL5-1, and a seventh-1 scan line GL7-1 to each other.

For example, the third-2 scan line GL3-2 may be configured to receive the first-2 scan signal from the first-2 scan line GL1-2 through the second horizontal scan line GLH2. The third-2 scan line GL3-2 may be configured to transmit the first-2 scan signal to the third pixel group PG3.

In a plan view, the second horizontal scan line GLH2 may extend substantially in the x-axis direction. For example, the second horizontal scan line GLH2 may electrically connect the first-2 scan line GL1-2 and the third-2 scan line GL3-2 to each other. For example, the second horizontal scan line GLH2 may electrically connect the first-2 scan line GL1-2, the third-2 scan line GL3-2, a fifth-2 scan line GL5-2, and a seventh-2 scan line GL7-2 to each other.

For example, the third-3 scan line GL3-3 may be configured to receive the first-3 scan signal from the first-3 scan line GL1-3 through the third horizontal scan line GLH3. The third-3 scan line GL3-3 may be configured to transmit the first-3 scan signal to the third pixel group PG3.

In a plan view, the third horizontal scan line GLH3 may extend substantially in the x-axis direction. For example, the third horizontal scan line GLH3 may electrically connect the first-3 scan line GL1-3 and the third-3 scan line GL3-3 to each other. For example, the third horizontal scan line GLH3 may electrically connect the first-3 scan line GL1-3, the third-3 scan line GL3-3, a fifth-3 scan line GL5-3, and a seventh-3 scan line GL7-3 to each other.

For example, the third-4 scan line GL3-4 may be configured to receive the first emission control signal from the first-4 scan line GL1-4 through the fourth horizontal scan line GLH4. The third-4 scan line GL3-4 may be configured to transmit the first emission control signal to the third pixel group PG3.

In a plan view, the fourth horizontal scan line GLH4 may extend substantially in the x-axis direction. For example, the fourth horizontal scan line GLH4 may electrically connect the first-4 scan line GL1-4 and the third-4 scan line GL3-4 to each other. For example, the fourth horizontal scan line GLH4 may electrically connect the first-4 scan line GL1-4, the third-4 scan line GL3-4, a fifth-4 scan line GL5-4, and a seventh-4 scan line GL7-4 to each other.

The fourth scan line GL4 may include a fourth-1 scan line GL4-1, a fourth-2 scan line GL4-2, a fourth-3 scan line GL4-3, and a fourth-4 scan line GL4-4. For example, the fourth-1 scan line GL4-1 may be configured to receive the second-1 scan signal from the second-1 scan line GL2-1 through a fifth horizontal scan line GLH5. The fourth-1 scan line GL4-1 may be configured to transmit the second-1 scan signal to the fourth pixel group PG4.

In a plan view, the fifth horizontal scan line GLH5 may extend substantially in the x-axis direction. For example, the fifth horizontal scan line GLH5 may electrically connect the second-1 scan line GL2-1 and the fourth-1 scan line GL4-1 to each other. For example, the fifth horizontal scan line GLH5 may electrically connect the second-1 scan line GL2-1, the fourth-1 scan line GL4-1, a sixth-1 scan line GL6-1, and an eighth-scan line GL8-1 to each other.

For example, the fourth-2 scan line GL4-2 may be configured to receive the second-2 scan signal from the second-2 scan line GL2-2 through a sixth horizontal scan line GLH6. The fourth-2 scan line GL4-2 may be configured to transmit the second-2 scan signal to the fourth pixel group PG4.

In a plan view, the sixth horizontal scan line GLH6 may extend substantially in the x-axis direction. For example, the sixth horizontal scan line GLH6 may electrically connect the second-2 scan line GL2-2 and the fourth-2 scan line GL4-2 to each other. For example, the sixth horizontal scan line GLH6 may electrically connect the second-2 scan line GL2-2, the fourth-2 scan line GL4-2, a sixth-2 scan line GL6-2, and an eighth-2 scan line GL8-2 to each other.

For example, the fourth-3 scan line GL4-3 may be configured to receive the second-3 scan signal from the second-3 scan line GL2-3 through a seventh horizontal scan line GLH7. The fourth-3 scan line GL4-3 may be configured to transmit the second-3 scan signal to the fourth pixel group PG4.

In a plan view, the seventh horizontal scan line GLH7 may extend substantially in the x-axis direction. For example, the seventh horizontal scan line GLH7 may electrically connect the second-3 scan line GL2-3 and the fourth-3 scan line GL4-3 to each other. For example, the seventh horizontal scan line GLH7 may electrically connect the second-3 scan line GL2-3, the fourth-3 scan line GL4-3, a sixth-3 scan line GL6-3, and an eighth-3 scan line GL8-3.

For example, the fourth-4 scan line GL4-4 may be configured to receive the second emission control signal from the second-4 scan line GL2-4 through an eighth horizontal scan line GLH8. The fourth-4 scan line GL4-4 may be configured to transmit the second emission control signal to the fourth pixel group PG4.

In a plan view, the eighth horizontal scan line GLH8 may extend substantially in the x-axis direction. For example, the eighth horizontal scan line GLH8 may electrically connect the second-4 scan line GL2-4 and the fourth-4 scan line GL4-4 to each other. For example, the eighth horizontal scan line GLH8 may electrically connect the second-4 scan line GL2-4, the fourth-4 scan line GL4-4, a sixth-4 scan line GL6-4, and an eighth-4 scan line GL8-4.

The fifth scan line GL5 may include the fifth-1 scan line GL5-1, the fifth-2 scan line GL5-2, the fifth-3 scan line GL5-3, and the fifth-4 scan line GL5-4. For example, the fifth-1 scan line GL5-1 may be configured to receive the first-1 scan signal from the first-1 scan line GL1-1 through the first horizontal scan line GLH1. The fifth-1 scan line GL5-1 may be configured to transmit the first-1 scan signal to the fifth pixel group PG5.

For example, the fifth-2 scan line GL5-2 may be configured to receive the first-2 scan signal from the first-2 scan line GL1-2 through the second horizontal scan line GLH2. The fifth-2 scan line GL5-2 may be configured to transmit the first-2 scan signal to the fifth pixel group PG5.

For example, the fifth-3 scan line GL5-3 may be configured to receive the first-3 scan signal from the first-3 scan line GL1-3 through the third horizontal scan line GLH3. The fifth-3 scan line GL5-3 may be configured to transmit the first-3 scan signal to the fifth pixel group PG5.

For example, the fifth-4 scan line GL5-4 may be configured to receive the first emission control signal from the first-4 scan line GL1-4 through the fourth horizontal scan line GLH4. The fifth-4 scan line GL5-4 may be configured to transmit the first emission control signal to the fifth pixel group PG5.

The sixth scan line GL6 may include the sixth-1 scan line GL6-1, the sixth-2 scan line GL6-2, the sixth-3 scan line GL6-3, and the sixth-4 scan line GL6-4. For example, the sixth-1 scan line GL6-1 may be configured to receive the second-1 scan signal from the second-1 scan line GL2-1 through the fifth horizontal scan line GLH5. The sixth-1 scan line GL6-1 may be configured to transmit the second-1 scan signal to the sixth pixel group PG6.

For example, the sixth-2 scan line GL6-2 may be configured to receive the second-2 scan signal from the second-2 scan line GL2-2 through the sixth horizontal scan line GLH6. The sixth-2 scan line GL6-2 may be configured to transmit the second-2 scan signal to the sixth pixel group PG6.

For example, the sixth-3 scan line GL6-3 may be configured to receive the second-3 scan signal from the second-3 scan line GL2-3 through the seventh horizontal scan line GLH7. The sixth-3 scan line GL6-3 may be configured to transmit the second-3 scan signal to the sixth pixel group PG6.

For example, the sixth-4 scan line GL6-4 may be configured to receive the second emission control signal from the second-4 scan line GL2-4 through the eighth horizontal scan line GLH8. The sixth-4 scan line GL6-4 may be configured to transmit the second emission control signal to the sixth pixel group PG6.

The seventh scan line GL7 may include the seventh-1 scan line GL7-1, the seventh-2 scan line GL7-2, the seventh-3 scan line GL7-3, and the seventh-4 scan line GL7-4. For example, the seventh-1 scan line GL7-1 may be configured to receive the first-1 scan signal from the first-1 scan line GL1-1 through the first horizontal scan line GLH1. The seventh-1 scan line GL7-1 may be configured to transmit the first-1 scan signal to the seventh pixel group PG7.

For example, the seventh-2 scan line GL7-2 may be configured to receive the first-2 scan signal from the first-2 scan line GL1-2 through the second horizontal scan line GLH2. The seventh-2 scan line GL7-2 may be configured to transmit the first-2 scan signal to the seventh pixel group PG7.

For example, the seventh-3 scan line GL7-3 may be configured to receive the first-3 scan signal from the first-3 scan line GL1-3 through the third horizontal scan line GLH3. The seventh-3 scan line GL7-3 may be configured to transmit the first-3 scan signal to the seventh pixel group PG7.

For example, the seventh-4 scan line GL7-4 may be configured to receive the first emission control signal from the first-4 scan line GL1-4 through the fourth horizontal scan line GLH4. The seventh-4 scan line GL7-4 may be configured to transmit the first emission control signal to the seventh pixel group PG7.

The eighth scan line GL8 may include the eighth-1 scan line GL8-1, the eighth-2 scan line GL8-2, the eighth-3 scan line GL8-3, and the eighth-4 scan line GL8-4. For example, the eighth-1 scan line GL8-1 may be configured to receive the second-1 scan signal from the second-1 scan line GL2-1 through the fifth horizontal scan line GLH5. The eighth-1 scan line GL8-1 may be configured to transmit the second-1 scan signal to the eighth pixel group PG8.

For example, the eighth-2 scan line GL8-2 may be configured to receive the second-2 scan signal from the second-2 scan line GL2-2 through the sixth horizontal scan line GLH6. The eighth-2 scan line GL8-2 may be configured to transmit the second-2 scan signal to the eighth pixel group PG8.

For example, the eighth-3 scan line GL8-3 may be configured to receive the second-3 scan signal from the second-3 scan line GL2-3 through the seventh horizontal scan line GLH7. The eighth-3 scan line GL8-3 may be configured to transmit the second-3 scan signal to the eighth pixel group PG8.

For example, the eighth-4 scan line GL8-4 may be configured to receive the second emission control signal from the second-4 scan line GL2-4 through the eighth horizontal scan line GLH8. The eighth-4 scan line GL8-4 may be configured to transmit the second emission control signal to the eighth pixel group PG8.

As described above, the first horizontal scan line GLH1 may be electrically connected to the first pixel group PG1, the third pixel group PG3, the fifth pixel group PG5, and the seventh pixel group PG7 and may be configured to receive the first-1 scan signal from the first gate driver 131 and transmit the first-1 scan signal to the first pixel group PG1, the third pixel group PG3, the fifth pixel group PG5, and the seventh pixel group PG7. In other words, the first horizontal scan line GLH1 may be configured to transmit the first-1 scan signal to a total of 4 or 4n pixel groups. The first horizontal scan line GLH1 may electrically connect the total of 4 or 4n pixel groups and the first gate driver 131 to each other. The first horizontal scan line GLH1 may electrically connect the first-1 scan line GL1-1, the third-1 scan line GL3-1, the fifth-1 scan line GL5-1, and the seventh-1 scan line GL7-1 to each other.

The second horizontal scan line GLH2 may be electrically connected to the first pixel group PG1, the third pixel group PG3, the fifth pixel group PG5, and the seventh pixel group PG7 and may be configured to receive the first-2 scan signal from the first gate driver 131 and transmit the first-2 scan signal to the first pixel group PG1, the third pixel group PG3, the fifth pixel group PG5, and the seventh pixel group PG7. In other words, the second horizontal scan line GLH2 may be configured to transmit the first-2 scan signal to the total of 4 or 4n pixel groups. The second horizontal scan line GLH2 may electrically connect the total of 4 or 4n pixel groups and the first gate driver 131 to each other. The second horizontal scan line GLH2 may electrically connect the first-2 scan line GL1-2, the third-2 scan line GL3-2, the fifth-2 scan line GL5-2, and the seventh-2 scan line GL7-2 to each other.

The third horizontal scan line GLH3 may be electrically connected to the first pixel group PG1, the third pixel group PG3, the fifth pixel group PG5, and the seventh pixel group PG7 and may be configured to receive the first-3 scan signal from the first gate driver 131 and transmit the first-3 scan signal to the first pixel group PG1, the third pixel group PG3, the fifth pixel group PG5, and the seventh pixel group PG7. In other words, the third horizontal scan line GLH3 may be configured to transmit the first-3 scan signal to the total of 4 or 4n pixel groups. The third horizontal scan line GLH3 may electrically connect the total of 4 or 4n pixel groups and the first gate driver 131 to each other. The third horizontal scan line GLH3 may electrically connect the first-3 scan line GL1-3, the third-3 scan line GL3-3, the fifth-3 scan line GL5-3, and the seventh-3 scan line GL7-3 to each other.

The fourth horizontal scan line GLH4 may be electrically connected to the first pixel group PG1, the third pixel group PG3, the fifth pixel group PG5, and the seventh pixel group PG7 and may be configured to receive the first emission control signal from the first gate driver 131 and transmit the first emission control signal to the first pixel group PG1, the third pixel group PG3, the fifth pixel group PG5, and the seventh pixel group PG7. In other words, the fourth horizontal scan line GLH4 may be configured to transmit the first emission control signal to the total of 4 or 4n pixel groups. The fourth horizontal scan line GLH4 may electrically connect the total of 4 or 4n pixel groups and the first gate driver 131 to each other. The fourth horizontal scan line GLH4 may electrically connect the first-4 scan line GL1-4, the third-4 scan line GL3-4, the fifth-4 scan line GL5-4, and the seventh-4 scan line GL7-4 to each other.

The fifth horizontal scan line GLH5 may be electrically connected to the second pixel group PG2, the fourth pixel group PG4, the sixth pixel group PG6, and the eighth pixel group PG8 and may be configured to receive the second-1 scan signal from the first gate driver 131 and transmit the second-1 scan signal to the second pixel group PG2, the fourth pixel group PG4, the sixth pixel group PG6, and the eighth pixel group PG8. In other words, the fifth horizontal scan line GLH5 may be configured to transmit the second-1 scan signal to the total of 4 or 4n pixel groups. The fifth horizontal scan line GLH5 may electrically connect the total of 4 or 4n pixel groups and the first gate driver 131 to each other. The fifth horizontal scan line GLH5 may electrically connect the second-1 scan line GL2-1, the fourth-1 scan line GL4-1, the sixth-1 scan line GL6-1, and the eighth-1 scan line GL8-1 to each other.

The sixth horizontal scan line GLH6 may be electrically connected to the second pixel group PG2, the fourth pixel group PG4, the sixth pixel group PG6, and the eighth pixel group PG8 and may be configured to receive the second-2 scan signal from the first gate driver 131 and transmit the second-2 scan signal to the second pixel group PG2, the fourth pixel group PG4, the sixth pixel group PG6, and the eighth pixel group PG8. In other words, the sixth horizontal scan line GLH6 may be configured to transmit the second-2 scan signal to the total of 4 or 4n pixel groups. The sixth horizontal scan line GLH6 may electrically connect the total of 4 or 4n pixel groups and the first gate driver 131 to each other. The sixth horizontal scan line GLH6 may electrically connect the second-2 scan line GL2-2, the fourth-2 scan line GL4-2, the sixth-2 scan line GL6-2, and the eighth-2 scan line GL8-2 to each other.

The seventh horizontal scan line GLH7 may be electrically connected to the second pixel group PG2, the fourth pixel group PG4, the sixth pixel group PG6, and the eighth pixel group PG8 and may be configured to receive the second-3 scan signal from the first gate driver 131 and transmit the second-3 scan signal to the second pixel group PG2, the fourth pixel group PG4, the sixth pixel group PG6, and the eighth pixel group PG8. In other words, the seventh horizontal scan line GLH7 may be configured to transmit the second-3 scan signal to the total of 4 or 4n pixel groups. The seventh horizontal scan line GLH7 may electrically connect the total of 4 or 4n pixel groups and the first gate driver 131 to each other. The seventh horizontal scan line GLH7 may electrically connect the second-3 scan line GL2-3, the fourth-3 scan line GL4-3, the sixth-3 scan line GL6-3, and the eighth-3 scan line GL8-3 to each other.

The eighth horizontal scan line GLH8 may be electrically connected to the second pixel group PG2, the fourth pixel group PG4, the sixth pixel group PG6, and the eighth pixel group PG8 and may be configured to receive the second emission control signal from the first gate driver 131 and transmit the second emission control signal to the second pixel group PG2, the fourth pixel group PG4, the sixth pixel group PG6, and the eighth pixel group PG8. In other words, the eighth horizontal scan line GLH8 may be configured to transmit the second emission control signal to the total of 4 or 4n pixel groups. The eighth horizontal scan line GLH8 may electrically connect the total of 4 or 4n pixel groups and the first gate driver 131 to each other. The eighth horizontal scan line GLH8 may electrically connect the second-4 scan line GL2-4, the fourth-4 scan line GL4-4, the sixth-4 scan line GL6-4, and the eighth-4 scan line GL8-4 to each other.

In one or more embodiments, the display apparatus may include the substrate 200, the first gate driver 131, and the data driver 120, the substrate 200 including the display area DA and the first peripheral area PA1 on one side of the display area DA, the first gate driver 131 being located in the first peripheral area PA1, and the data driver 120 being located in the first peripheral area PA1 (e.g., see FIG. 6).

In one or more embodiments, the display apparatus may further include a plurality of pixel groups arranged in the display area DA, including a plurality of display elements arranged along the second direction (e.g., the y-axis direction, hereinafter the same) in a plan view, and including at least the first pixel group PG1 to the fourth pixel group PG4.

In one or more embodiments, the display apparatus may include a plurality of scan lines extending in the second direction and connected to the first gate driver 131. In a plan view, the first scan line GL1 may extend in the second direction and may connect the first gate driver 131 and the first pixel group PG1 to each other. In a plan view, the second scan line GL2 may extend in the second direction and may connect the first gate driver 131 and the second pixel group PG2 to each other. In a plan view, the third scan line GL3 may extend in the second direction and may connect the first gate driver 131 and the third pixel group PG3 to each other.

In one or more embodiments, the display apparatus may include a plurality of horizontal scan lines that, in a plan view, extend in the first direction (e.g., the x-axis direction, hereinafter the same) crossing the second direction and connect some of the plurality of scan lines and other ones of the plurality of scan lines to each other. The plurality of horizontal scan lines may include the first horizontal scan line GLH1, and the first horizontal scan line GLH1 may connect the first scan line GL1 and the third scan line GL3 to each other.

In one or more embodiments, the first scan line GL1 may be configured to receive the first scan signal from the first gate driver 131 and transmit the first scan signal to the first pixel group PG1, and the third scan line GL3 may be configured to receive the first scan signal through the first horizontal scan line GLH1 and transmit the first scan signal to the third pixel group PG3.

In one or more embodiments, the plurality of scan lines may further include the fourth scan line GL4. In a plan view, the fourth scan line GL4 may extend in the first direction and may connect the first gate driver 131 and the fourth pixel group PG4 to each other. In one or more embodiments, the plurality of horizontal scan lines may include the second horizontal scan line GLH2 that extend in the first direction in a plan view and connect the second scan line GL2 and the fourth scan line GL4 to each other.

In one or more embodiments, the second scan line GL2 may be configured to receive the second scan signal from the first gate driver 131 and transmit the second scan signal to the second pixel group PG2, and the fourth scan line GL4 may be configured to receive the second scan signal through the second horizontal scan line GLH2 and transmit the second scan signal to the fourth pixel group PG4.

In one or more embodiments, the display apparatus may further include the first data line DL1 and the first vertical data line DLP1, the first data line DL1 being connected to a display element of the first pixel group PG1 and extending in the first direction in a plan view, and the first vertical data line DLP1 extending in the second direction in a plan view and connecting the first data line DL1 and the data driver 120 to each other.

In one or more embodiments, in a plan view, the first gate driver 131 may be arranged on one side of the first peripheral area PA1, and the data driver 120 may be arranged on the other side of the first peripheral area PA1.

In one or more embodiments, in a plan view, the first vertical data line DLP1 may be arranged in an area of the display area DA corresponding to the other side of the first peripheral area PA1.

In one or more embodiments, in a plan view, the first scan line GL1 may be arranged in an area of the display area DA corresponding to one side of the first peripheral area PA1.

In one or more embodiments, the display apparatus may further include a plurality of scan lines including at least the first scan line GL1, the second scan line GL2, and the third scan line GL3, and the first horizontal scan line GLH1 may be connected to 4n scan lines from among the plurality of scan lines.

In one or more embodiments, one of the aforementioned 4n scan lines may be connected to the first gate driver 131, and the aforementioned 4n scan lines may be configured to receive the same scan signal generated by the first gate driver 131.

As described above, the display apparatus according to one or more embodiments uses the plurality of horizontal scan lines such that the number of scan lines that are directly connected to the first gate driver 131 and controlled by the first gate driver 131 may be reduced. When the number of scan lines directly connected to the first gate driver 131 decreases, the area of the first peripheral area PA1 where the scan lines and the first gate driver 131 are connected to each other may be significantly reduced. As in the present embodiment, when the 4n pixel groups may be controlled with only one scan signal commonly transmitted along the 4n scan lines, the number of scan lines directly connected to the first gate driver 131 may be reduced to ¼n.

In particular, in the display apparatus according to one or more embodiments, the first gate driver 131 and the data driver 120 are both arranged in the first peripheral area PA1. This characteristic may require scan lines and data lines to be mounted in a narrower area. However, in the display apparatus according to one or more embodiments, the number of scan lines is reduced to ¼n, and thus, the first gate driver 131 and the data driver 120 may be arranged together in the first peripheral area PA1.

Also, the reason the 4n scan lines are mentioned is because a diamond pixel structure has a pixel layout arranged in RGBG. Accordingly, controlling the 4n pixel groups with one scan signal is efficient, and preferably, four pixel groups may be controlled with one scan signal.

For reference, a formula for calculating a unit number of scan lines per pixel is as follows.

$$(\text{Unit number of scan lines per pixel}) = \frac{\text{Gate line}}{\text{Source Line} \times RG(BG) \times \text{Scan Driver} + n} \quad \text{[Equation 1]}$$

For example, when the display panel of FIG. 8 has a resolution of 1812×2176, in Equation 1, source line refers to the number of vertical lines of resolution and may be 1812, gate line refers to the number of horizontal lines of resolution and may be 2176, RG(BG) refers to the number of types of pixel per scan line and may be 2 (assuming a diamond structure), and scan driver refers to the number of drivers and may be 4. In this case, when the number n of scan line bundles is 4 (one scan signal is transmitted through four scan lines), the unit number of scan lines per pixel in the display panel of FIG. 8 may be about 0.6.

The smaller the unit number of scan lines per pixel derived according to Equation 1, the smaller the area of the first peripheral area PA1 may be. As described above, in order to reduce the area of the first peripheral area PA1, bundled driving of a plurality of scan lines (e.g., 4 or 4n) is required. However, because the load on the scan lines may increase during bundled driving, a compromise is needed between the load on one scan line and the number of scan line bundles to reduce the area of the first peripheral area PA1.

In the one-side driving method, the unit number of scan lines per pixel may be about 0.6 at a resolution of 1812×2176, and accordingly, there may be four scan lines configured to receive one scan signal.

Also, because the first gate driver 131 and the data driver 120 need to be arranged in the first peripheral area PA1, the plurality of data lines may be easily connected to the data driver 120 by the vertical data lines. That is, by using the vertical data lines, the first gate driver 131 and the data driver 120 may be arranged together in the first peripheral area PA1.

For example, the first-1 scan signal described with reference to FIG. 8 is an initialization control signal and may be transmitted to each of display elements of the first pixel group PG1. The initialization control signal is a signal that controls the aforementioned initialization transistor and may be transmitted to an anode electrode of an OLED. The initialization control signal may be generated by the first gate driver 131.

For example, the first-2 scan signal described with reference to FIG. 8 is a bypass signal and may be transmitted to each of display elements of the first pixel group PG1. The bypass signal may be a signal for transmitting the aforementioned initialization control signal to the anode electrode of the OLED and may be generated by the first gate driver 131.

For example, the first-3 scan signal described with reference to FIG. 8 is a scan signal and may be transmitted to each of display elements of the first pixel group PG1. The scan signal is a signal that controls the aforementioned driving transistor and may be generated by the first gate driver 131.

For example, the first emission control signal described with reference to FIG. 8 may be an emission control signal for supplying a driving current to the OLED. For example, the driving current may be supplied to the OLED during an activation period of the emission control signal, and the driving current may not be transmitted to the OLED during a deactivation period of the emission control signal.

For example, the second-1 scan signal may be an initialization control signal like the first-1 scan signal, the second-2 scan signal may be a bypass signal like the first-2 scan signal, the second-3 scan signal may be a scan signal like the first-3 scan signal, and the second emission control signal may be a signal for supplying a driving current like the first emission control signal.

For convenience of description, only the first-1 scan signal to the second-3 scan signal, the first emission control signal, and the second emission control signal have been described. However, a person of ordinary skill in the art would understand that the descriptions of the other scan signals and/or emission control signals may also be replaced with those described above. For convenience of description and illustration, descriptions and drawings for the other scan signals and/or emission control signals are omitted. It may be understood that the same applies to examples of other drawings.

For example, in a plan view, the n-th pixel group may be between the (n−1)-th pixel group and the (n+1)-th pixel group. For example, in a plan view, the n-th scan line may be between the (n−1)-th scan line and the (n+1)-th scan line. For example, in a plan view, the n-th data line may be between the (n−1)-th data line and the (n+1)-th data line. For example, in a plan view, the n-th vertical data line may be between the (n−1)-th vertical data line and the (n+1)-th vertical data line. For example, in a plan view, the n-th horizontal scan line may be between the (n−1)-th horizontal scan line and the (n+1)-th horizontal scan line.

Figure 9:
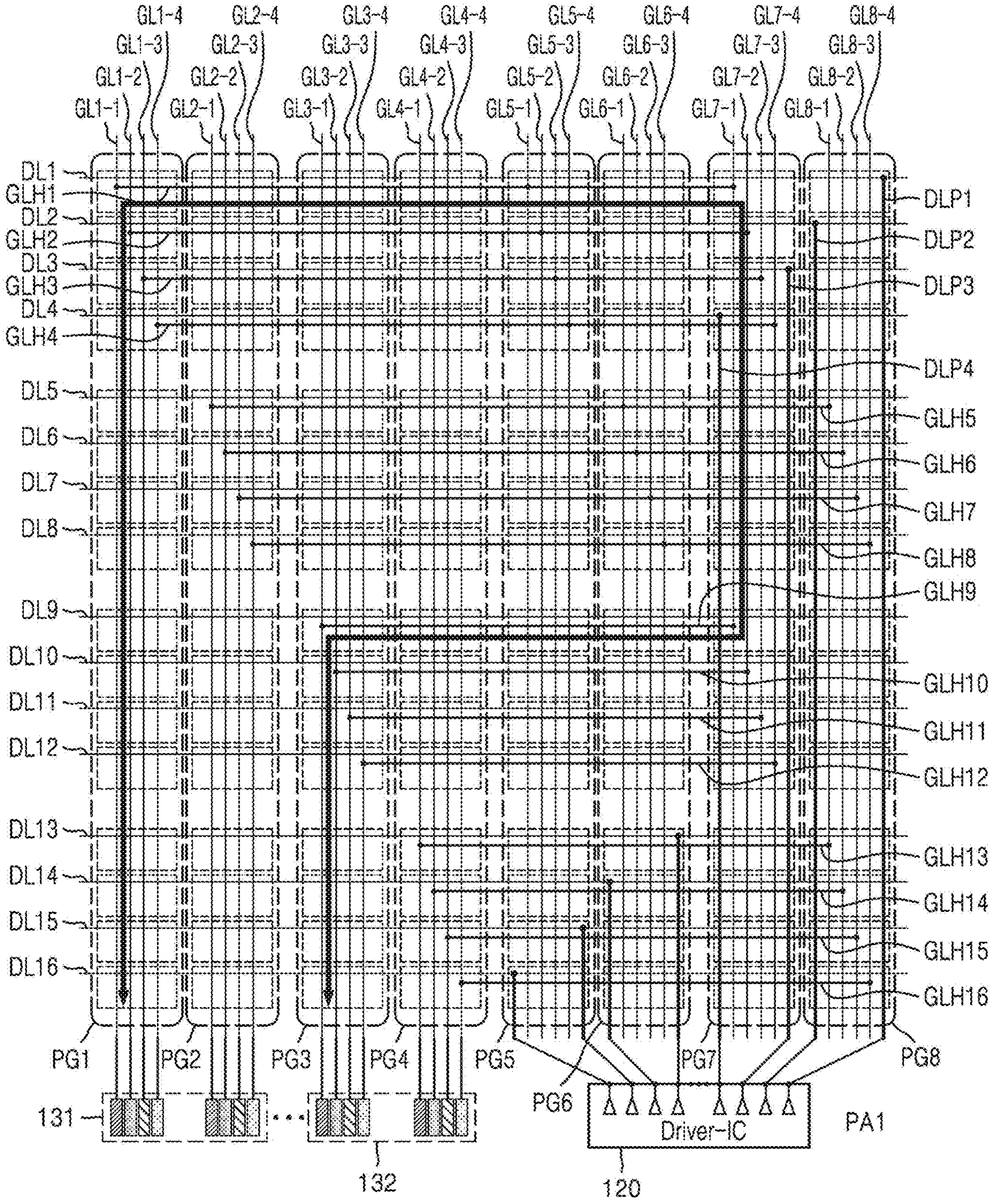
FIG. 9 is a schematic plan view illustrating an example of the display panel of FIG. 1.

FIG. 9 is a schematic plan view illustrating an example of the display panel of FIG. 1. For reference, descriptions of FIG. 9, which are substantially the same as those described above, may be omitted.

As shown in FIG. 9, the display panel may include the first horizontal scan line GLH1 to a sixteenth horizontal scan line GLH16. Unlike FIG. 8, the display panel of FIG. 9 may be driven by using the double-side driving method.

Unlike FIG. 8, the first horizontal scan line GLH1 may be electrically connected to the first-1 scan line GL1-1, the fifth-1 scan line GL5-1, and the seventh-1 scan line GL7-1. The first horizontal scan line GLH1 may be configured to transmit, to the fifth-1 scan line GL5-1 and the seventh-1 scan line GL7-1, the first-1 scan signal received through the first-1 scan line GL1-1. As a result, the first-1 scan signal may be transmitted to the first pixel group PG1, the fifth pixel group PG5, and the seventh pixel group PG7.

The first-1 scan signal may be transmitted to a ninth horizontal scan line GLH9 connected to the seventh-1 scan line GL7-1. The ninth horizontal scan line GLH9 may electrically connect the seventh-1 scan line GL7-1 and the third-1 scan line GL3-1 to each other. As a result, the first-1 scan signal may be transmitted to the third-scan line GL3-1 through the ninth horizontal scan line GLH9. The first-1 scan signal may be transmitted to the third pixel group PG3 through the ninth horizontal scan line GLH9.

Unlike FIG. 8, the second horizontal scan line GLH2 may be electrically connected to the first-2 scan line GL1-2, the fifth-2 scan line GL5-2, and the seventh-2 scan line GL7-2. The second horizontal scan line GLH2 may be configured to transmit, to the fifth-2 scan line GL5-2 and the seventh-2 scan line GL7-2, the first-2 scan signal received through the first-2 scan line GL1-2. As a result, the first-2 scan signal may be transmitted to the first pixel group PG1, the fifth pixel group PG5, and the seventh pixel group PG7.

The first-2 scan signal may be transmitted to a tenth horizontal scan line GLH10 connected to the seventh-2 scan line GL7-2. The tenth horizontal scan line GLH10 may electrically connect the seventh-2 scan line GL7-2 and the third-2 scan line GL3-2 to each other. As a result, the first-2 scan signal may be transmitted to the third-2 scan line GL3-2 through the tenth horizontal scan line GLH10. The first-2 scan signal may be transmitted to the third pixel group PG3 through the tenth horizontal scan line GLH10.

Unlike FIG. 8, the third horizontal scan line GLH3 may be electrically connected to the first-3 scan line GL1-3, the fifth-3 scan line GL5-3, and the seventh-3 scan line GL7-3. The third horizontal scan line GLH3 may be configured to transmit, to the fifth-3 scan line GL5-3 and the seventh-3 scan line GL7-3, the first-3 scan signal received through the first-3 scan line GL1-3. As a result, the first-3 scan signal may be transmitted to the first pixel group PG1, the fifth pixel group PG5, and the seventh pixel group PG7.

The first-3 scan signal may be transmitted to an eleventh horizontal scan line GLH11 connected to the seventh-3 scan line GL7-3. The eleventh horizontal scan line GLH11 may electrically connect the seventh-3 scan line GL7-3 and the third-3 scan line GL3-3 to each other. As a result, the first-3 scan signal may be transmitted to the third-3 scan line GL3-3 through the eleventh horizontal scan line GLH11. The first-3 scan signal may be transmitted to the third pixel group PG3 through the eleventh horizontal scan line GLH11.

Unlike FIG. 8, the fourth horizontal scan line GLH4 may electrically connect the first-4 scan line GL1-4, the fifth-4 scan line GL5-4, and the seventh-4 scan line GL7-4 to each other. The fourth horizontal scan line GLH4 may be configured to transmit, to the fifth-4 scan line GL5-4 and the seventh-4 scan line GL7-4, the first emission control signal received through the first-4 scan line GL1-4. As a result, the first emission control signal may be transmitted to the first pixel group PG1, the fifth pixel group PG5, and the seventh pixel group PG7.

The first emission control signal may be transmitted to a twelfth horizontal scan line GLH12 connected to the seventh-4 scan line GL7-4. The twelfth horizontal scan line GLH12 may electrically connect the seventh-4 scan line GL7-4 and the third-4 scan line GL3-4 to each other. As a result, the first emission control signal may be transmitted to the third-4 scan line GL3-4 through the twelfth horizontal scan line GLH12. The first emission control signal may be transmitted to the third pixel group PG3 through the twelfth horizontal scan line GLH12.

Unlike FIG. 8, the fifth horizontal scan line GLH5 may be electrically connected to the second-1 scan line GL2-1, the sixth-1 scan line GL6-1, and the eighth-1 scan line GL8-1. The fifth horizontal scan line GLH5 may be configured to transmit, to the sixth-1 scan line GL6-1 and the eighth-1 scan line GL8-1, the second-1 scan signal received through the second-1 scan line GL2-1. As a result, the second-1 scan signal may be transmitted to the second pixel group PG2, the sixth pixel group PG6, and the eighth pixel group PG8.

The second-1 scan signal may be transmitted to a thirteenth horizontal scan line GLH13 connected to the eighth-1 scan line GL8-1. The thirteenth horizontal scan line GLH13 may electrically connect the eighth-1 scan line GL8-1 and the fourth-1 scan line GL4-1 to each other. As a result, the second-1 scan signal may be transmitted to the fourth-1 scan line GL4-1 through the thirteenth horizontal scan line GLH13. The second-1 scan signal may be transmitted to the fourth pixel group PG4 through the thirteenth horizontal scan line GLH13.

Unlike FIG. 8, the sixth horizontal scan line GLH6 may be electrically connected to the second-2 scan line GL2-2, the sixth-2 scan line GL6-2, and the eighth-2 scan line GL8-2. The sixth horizontal scan line GLH6 may be configured to transmit, to the sixth-2 scan line GL6-2 and the eighth-2 scan line GL8-2, the second-2 scan signal received through the second-2 scan line GL2-2. As a result, the second-2 scan signal may be transmitted to the second pixel group PG2, the sixth pixel group PG6, and the eighth pixel group PG8.

The second-2 scan signal may be transmitted to a fourteenth horizontal scan line GLH14 connected to the eighth-2 scan line GL8-2. The fourteenth horizontal scan line GLH14 may electrically connect the eighth-2 scan line GL8-2 and the fourth-2 scan line GL4-2 to each other. As a result, the second-2 scan signal may be transmitted to the fourth-2 scan line GL4-2 through the fourteenth horizontal scan line GLH14. The second-2 scan signal may be transmitted to the fourth pixel group PG4 through the fourteenth horizontal scan line GLH14.

Unlike FIG. 8, the seventh horizontal scan line GLH7 may be electrically connected to the second-3 scan line GL2-3, the sixth-3 scan line GL6-3, and the eighth-3 scan line GL8-3. The seventh horizontal scan line GLH7 may be configured to transmit, to the sixth-3 scan line GL6-3 and the eighth-3 scan line GL8-3, the second-3 scan signal received through the second-3 scan line GL2-3. As a result, the second-3 scan signal may be transmitted to the second pixel group PG2, the sixth pixel group PG6, and the eighth pixel group PG8.

The second-3 scan signal may be transmitted to a fifteenth horizontal scan line GLH15 connected to the eighth-3 scan line GL8-3. The fifteenth horizontal scan line GLH15 may electrically connect the eighth-3 scan line GL8-3 and the fourth-3 scan line GL4-3 to each other. As a result, the second-3 scan signal may be transmitted to the fourth-3 scan line GL4-3 through the fifteenth horizontal scan line GLH15. The second-3 scan signal may be transmitted to the fourth pixel group PG4 through the fifteenth horizontal scan line GLH15.

Unlike FIG. 8, the eighth horizontal scan line GLH8 may be electrically connected to the second-4 scan line GL2-4, the sixth-4 scan line GL6-4, and the eighth-4 scan line GL8-4. The eighth horizontal scan line GLH8 may be configured to transmit, to the sixth-4 scan line GL6-4 and the eighth-4 scan line GL8-4, the second emission control signal received through the second-4 scan line GL2-4. As a result, the second emission control signal may be transmitted to the second pixel group PG2, the sixth pixel group PG6, and the eighth pixel group PG8.

The second emission control signal may be transmitted to the sixteenth horizontal scan line GLH16 connected through the eighth-4 scan line GL8-4. The sixteenth horizontal scan line GLH16 may electrically connect the eighth-4 scan line GL8-4 and the fourth-4 scan line GL4-4 to each other. As a result, the second emission control signal may be transmitted to a fourth-4 scan line through the sixteenth horizontal scan line GLH16. A second emission control signal may be transmitted to the fourth pixel group PG4 through the sixteenth horizontal scan line GLH16.

Because the display panel of FIG. 9 uses the double-side driving method, the first-1 scan signal, the first-2 scan signal, the first-3 scan signal, the first emission control signal, the second-1 scan signal, the second-2 scan signal, the second-3 scan signal, and the second emission control signal may be generated by the first gate driver 131 and the second gate driver 132. For example, the above signals may be generated by the first gate driver 131 and transmitted to the pixel groups through the scan lines, and the same signals may be generated by the second gate driver 132 and transmitted to the pixel groups through the scan lines. This is to prevent distortion of a signal or a decrease in the magnitude of a signal due to resistance toward the end of a wire.

In one or more embodiments, the display apparatus may include the substrate 200, the first gate driver 131, the data driver 120, and the second gate driver 132, the substrate 200 including the display area DA and the first peripheral area PA1 on one side of the display area DA, the first gate driver 131 being located in the first peripheral area PA1, the data driver 120 being located in the first peripheral area PA1, and the second gate driver 132 being located in the first peripheral area PA1 and being between the first gate driver 131 and the data driver 120 in a plan view.

In one or more embodiments, the display apparatus may further include a plurality of pixel groups including a plurality of display elements arranged in the display area DA along the second direction in a plan view, and a plurality of scan lines extending in the second direction in a plan view, wherein some of the scan lines are connected to the first gate driver 131 and other ones of the scan lines are connected to the second gate driver 132. In this case, the some of the scan lines and the other ones of the scan lines may be connected to each other by a plurality of horizontal scan lines.

In one or more embodiments, the plurality of pixel groups may include at least the first pixel group PG1 to the eighth pixel group PG8, and the plurality of scan lines may include the first scan line GL1 to the eighth scan line GL8 that are respectively connected to the first pixel group PG1 to the eighth pixel group PG8.

In one or more embodiments, the plurality of horizontal scan lines may include the first horizontal scan line GLH1, and the first scan line GL1 may be connected to the first pixel group PG1 and may be connected to the fifth scan line GL5 and the seventh scan line GL7 by the first horizontal scan line GLH1.

In one or more embodiments, the plurality of horizontal scan lines may further include a first additional horizontal scan line, and the seventh scan line GL7 may be connected to the third scan line GL3 by the first additional horizontal scan line.

In one or more embodiments, in a plan view, the first horizontal scan line GLH1 and the first additional horizontal scan line may be spaced (e.g., spaced apart) from each other in the second direction.

In one or more embodiments, the first pixel group PG1, the third pixel group PG3, the fifth pixel group PG5, and the seventh pixel group PG7 may be configured to receive the same scan signal generated by the first gate driver 131.

In one or more embodiments, the first scan line GL1 may be connected to the first gate driver 131, and the third scan line GL3 may be connected to the second gate driver 132.

In one or more embodiments, the plurality of horizontal scan lines may further include the second horizontal scan line GLH2, and the second scan line GL2 may be connected to the second pixel group PG2 and may be connected to the sixth scan line GL6 and the eighth scan line GL8 by the second horizontal scan line GLH2.

In one or more embodiments, the plurality of horizontal scan lines may further include a second additional horizontal scan line, and the eighth scan line GL8 may be connected to the fourth scan line GL4 by the second additional horizontal scan line.

In one or more embodiments, the display apparatus may include the first data line DL1 and the first vertical data line DLP1, the first data line DL1 being connected to a display element of the first pixel group PG1 and extending in the first direction in a plan view, the second direction crossing the first direction, and the first vertical data line DLP1 extending in the second direction in a plan view and connecting the first data line DL1 and the data driver 120 to each other. In this case, the display element described above may refer to one pixel PX or one OLED.

In one or more embodiments, the display apparatus may further include a plurality of scan lines including at least the first scan line GL1, the second scan line GL2, and the third scan line GL3, and the first horizontal scan line GLH1 may be connected to 4n scan lines from among the plurality of scan lines.

In one or more embodiments, one of the aforementioned 4n scan lines may be connected to the first gate driver 131, and the aforementioned 4n scan lines may be configured to receive the same scan signal generated by the first gate driver 131.

As described above, the display apparatus according to one or more embodiments uses the plurality of horizontal scan lines such that the number of scan lines that are directly connected to the first gate driver 131 and the second gate driver 132 and controlled by the first gate driver 131 and the second gate driver 132 may be reduced. When the number of scan lines directly connected to the first gate driver 131 and the second gate driver 132 decreases, the area of the first peripheral area PA1 where the scan lines, the first gate driver 131, and the second gate driver 132 are connected to each other may be significantly reduced. As in the present embodiment, when the 4n pixel groups may be controlled with only one scan signal transmitted along the 4n scan lines, the number of scan lines directly connected to the first gate driver 131 and the second gate driver 132 may be reduced to ¼n.

In particular, in the display apparatus according to one or more embodiments, the first gate driver 131, the second gate driver 132, and the data driver 120 are all arranged in the first peripheral area PA1. This characteristic may require scan lines and data lines to be mounted in a narrower area. However, in the display apparatus according to one or more embodiments, the number of scan lines is reduced to ¼n, and thus, the first gate driver 131, the second gate driver 132, and the data driver 120 may be arranged together in the first peripheral area PA1.

For reference, by using Equation 1 described above, the number of scan lines per pixel of the display panel using double-side driving as shown in FIG. 9 is as follows.

For example, when the display panel of FIG. 9 has a resolution of 1812×2176, source line refers to the number of vertical lines in the resolution and may be 1812, gate line refers to the number of horizontal lines in the resolution and may be 2176, RG(BG) refers to the number of types of pixel per scan line and may be 2 (assuming a diamond structure), and scan driver refers to the number of drivers and may be 4. In this case, when the number n of scan line bundles is 4 (one scan signal is transmitted through four scan lines), the unit number of scan lines per pixel in the display panel of FIG. 9 may be about 0.6.

The smaller the unit number of scan lines per pixel derived according to Equation 1, the smaller the area of the first peripheral area PA1 may be. As described above, in order to reduce the area of the first peripheral area PA1, bundled driving of a plurality of scan lines (e.g., 4 or 4n) is required. However, because the load on the scan lines may increase during bundled driving, a compromise is needed between the load on one scan line and the number of scan line bundles to reduce the area of the first peripheral area PA1.

In the one-side driving method, the unit number of scan lines per pixel may be about 0.6 at a resolution of 1812×2176, and accordingly, there may be four scan lines configured to receive one scan signal.

Also, because the first gate driver 131, the second gate driver 132, and the data driver 120 need to be arranged in the first peripheral area PA1, the plurality of data lines may be easily connected to the data driver 120 by the vertical data lines. That is, by using the vertical data lines, the first gate driver 131, the second gate driver 132, and the data driver 120 may be arranged together in the first peripheral area PA1.

For example, in a plan view, the n-th pixel group may be between the (n−1)-th pixel group and the (n+1)-th pixel group. For example, in a plan view, the n-th scan line may be between the (n−1)-th scan line and the (n+1)-th scan line. For example, in a plan view, the n-th data line may be between the (n−1)-th data line and the (n+1)-th data line. For example, in a plan view, the n-th vertical data line may be between the (n−1)-th vertical data line and the (n+1)-th vertical data line. For example, in a plan view, the n-th horizontal scan line may be between the (n−1)-th horizontal scan line and the (n+1)-th horizontal scan line.

Figure 10:
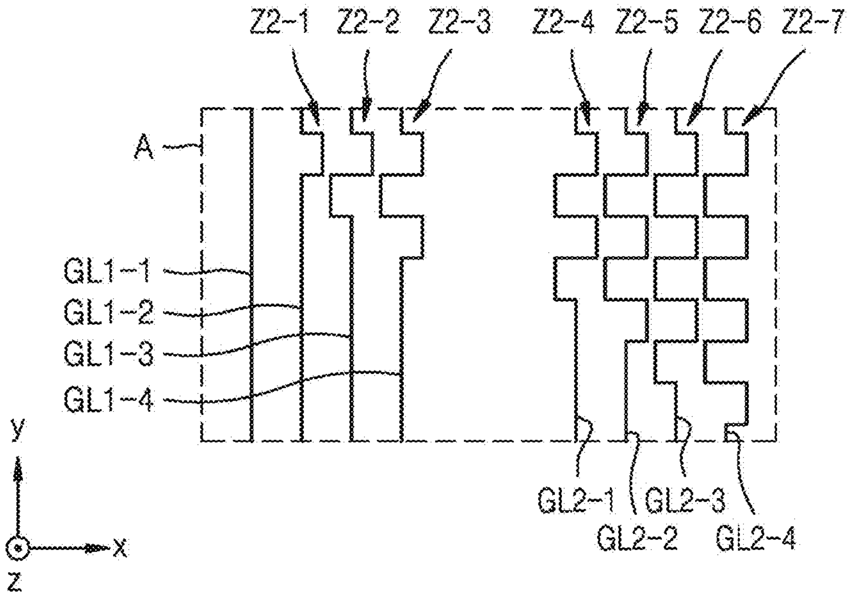
FIG. 10 is a schematic plan view illustrating an example of scan lines arranged in an area A of FIG. 8.

FIG. 10 is a schematic plan view illustrating an example of scan lines arranged in an area A of FIG. 8. For reference, descriptions of FIG. 10, which are substantially the same as those described above, may be omitted.

As shown in FIG. 10, total lengths of the first-1 scan line GL1-1 to the first-4 scan line GL1-4 need to be unified. In order to achieve uniformity in length, the length of a scan line having a shorter length from among the first-1 scan line GL1-1 to the first-4 scan line GL1-4 needs to be extended. Accordingly, the first-2 scan line GL1-2 may include a first extension portion, the first-3 scan line GL1-3 may include a second extension portion, and the first-4 scan line GL1-4 may include a third extension portion.

For example, a difference in length between wires may cause a difference in total resistance of the wires. The difference in resistance may affect signals transmitted through the wires. Accordingly, for uniform signal transmission, resistance values (or total lengths) of the wires need to be unified.

For example, the first-1 scan line GL1-1 may have a greater length than the first-2 scan line GL1-2. The first extension portion Z2-1 corresponding to a difference between the length of the first-1 scan line GL1-1 and the length of the first-2 scan line GL1-2 may be included in the first-2 scan line GL1-2. Due to the first extension portion Z2-1, the length of the first-1 scan line GL1-1 and the length of the first-2 scan line GL1-2 may be the same or substantially the same.

For example, the first-2 scan line GL1-2 may have a greater length than the first-3 scan line GL1-3. Accordingly, the first-3 scan line GL1-3 may include the second extension portion Z2-2 having a length greater than the length of the first extension portion Z2-1. Due to the second extension portion Z2-2, the length of the first-2 scan line GL1-2 and the length of the first-3 scan line GL1-3 may be the same or substantially the same.

For example, the first-3 scan line GL1-3 may have a greater length than the first-4 scan line GL1-4. Accordingly, the first-4 scan line GL1-4 may include the third extension portion Z2-3 having a length greater than the length of the second extension portion Z2-2. Due to the third extension portion Z2-3, the length of the first-3 scan line GL1-3 and the length of the first-4 scan line GL1-4 may be the same or substantially the same.

For example, the first-4 scan line GL1-4 may have a greater length than the second-1 scan line GL2-1. Accordingly, the second-1 scan line GL2-1 may include a fourth extension portion Z2-4 having a length greater than the length of the third extension portion Z2-3. Due to the fourth extension portion Z2-4, the length of the first-4 scan line GL1-4 and the length of the second-1 scan line GL2-1 may be the same or substantially the same.

For example, the second-1 scan line GL2-1 may have a greater length than the second-2 scan line GL2-2. Accordingly, the second-2 scan line GL2-2 may include a fifth extension portion Z2-5 having a length greater than the length of the fourth extension portion Z2-4. Due to the fifth extension portion Z2-5, the length of the second-1 scan line GL2-1 and the length of the second-2 scan line GL2-2 may be the same or substantially the same.

For example, the second-2 scan line GL2-2 may have a greater length than the second-3 scan line GL2-3. Accordingly, the second-3 scan line GL2-3 may include a sixth extension portion Z2-6 having a length greater than the length of the fifth extension portion Z2-5. Due to the sixth extension portion Z2-6, the length of the second-2 scan line GL2-2 and the length of the second-3 scan line GL2-3 may be the same or substantially the same.

For example, the second-3 scan line GL2-3 may have a greater length than the second-4 scan line GL2-4. Accordingly, the second-4 scan line GL2-4 may include a seventh extension portion Z2-7 having a length greater than the length of the sixth extension portion Z2-6. Due to the seventh extension portion Z2-7, the length of the second-3 scan line GL2-3 and the length of the second-4 scan line GL2-4 may be the same or substantially the same.

Figure 11:
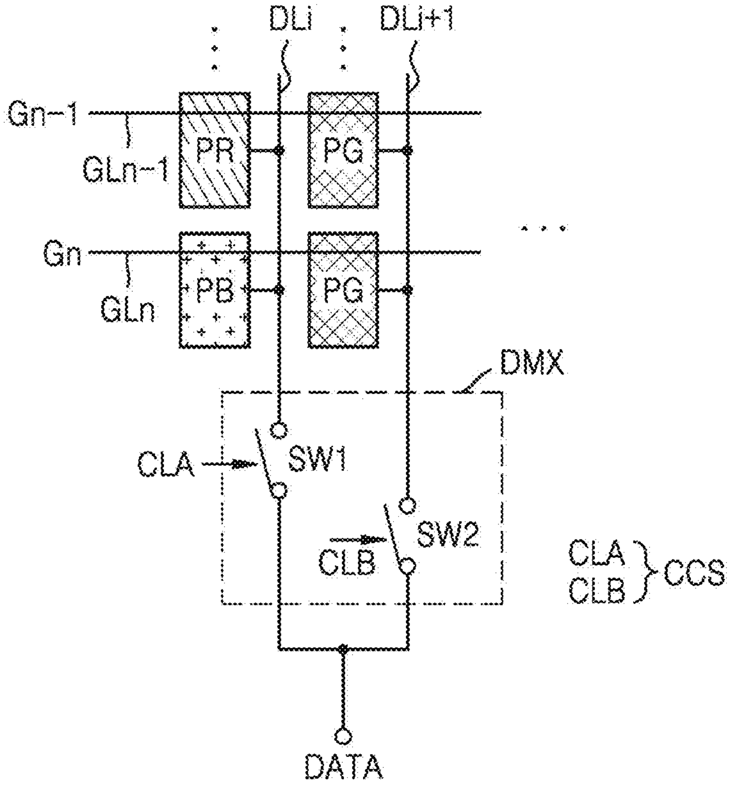
FIG. 11 is a diagram to describe an example of a demultiplexer.

FIG. 11 is a diagram to describe an example of a demultiplexer DMX.

FIG. 11 shows an example of the demultiplexer DMX selectively connected to an i-th data line DLi and a (i+1)-th data line DLi+1. The demultiplexer DMX may include a first switch SW1 and a second switch SW2.

The first switch SW1 may be connected to the i-th data line DLi. The first switch SW1 may be controlled by a first control signal CLA to apply the data signal DATA to the i-th data line DLi.

The second switch SW2 may be connected to the (i+1)-th data line DLi+1. The second switch SW2 may be controlled by a second control signal CLB to apply the data signal DATA to the (i+1)-th data line DLi+1.

A distribution control signal CCS may include the first control signal CLA and the second control signal CLB. The first control signal CLA and the second control signal CLB may be alternately applied at different timings such that the first control signal CLA and the second control signal CLB do not overlap each other.

For example, the pixels PX may include a first pixel PR, a second pixel PB, and a third pixel PG, which emit light of different colors. For example, the first pixel PR may be a red pixel that emits red light, the second pixel PB may be a blue pixel that emits blue light, and the third pixel PG may be a green pixel that emits green light.

For example, in a column where the i-th data line DLi is arranged, the first pixel PR and the second pixel PB may be alternately arranged and may be connected to the i-th data line DLi. In a column where the (i+1)-th data line DLi+1 is arranged, the third pixel PG is repeatedly arranged and may be connected to the (i+1)-th data line DLi+1. One of the i-th data line DLi and the (i+1)-th data line DLi+1 may be an odd data line DLo and the other thereof may be an even data line DLe. A pair of data lines connected to the demultiplexer DMX may be a pair of an odd data line and an even data line, which are spaced (e.g., spaced apart) by one column.

FIG. 11 shows pixels PX connected to a (n−1)-th scan line GLn−1 arranged in a (n−1)-th row and an n-th scan line GLn arranged in an n-th row.

Figure 12:
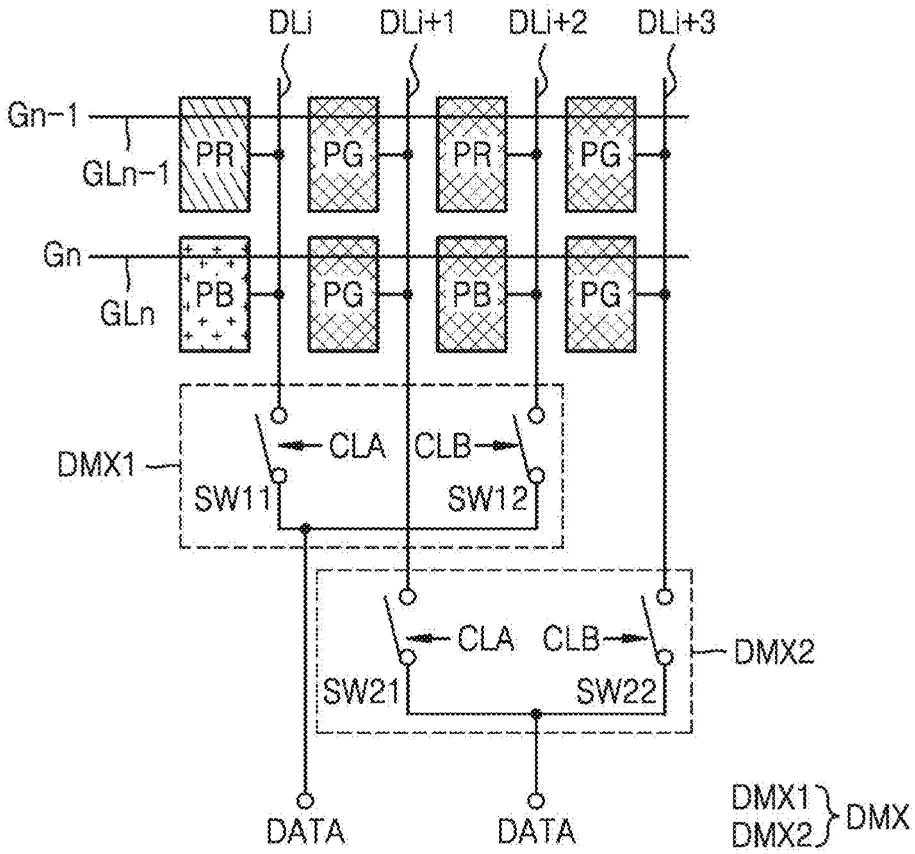
FIG. 12 is a diagram to describe another example of a demultiplexer.

FIG. 12 is a diagram to describe another example of a demultiplexer DMX.

As shown in FIG. 12, demultiplexers DMX may include first demultiplexers DMX1 and second demultiplexers DMX2. A first demultiplexer DMX1 may be selectively connected to the i-th data line DLi and a (i+2)-th data line DLi+2. A second demultiplexer DMX2 may be selectively connected to the (i+1)-th data line DLi+1 and a (i+3)-th data line DLi+3.

The first demultiplexers DMX1 may include a first switch SW11 and a second switch SW12.

The first switch SW11 may be connected to the i-th data line DLi. The first switch SW11 may be controlled by the first control signal CLA to apply the data signal DATA to the i-th data line DLi.

The second switch SW12 may be connected to the (i+2)-th data line DLi+2. The second switch SW12 may be controlled by the second control signal CLB to apply the data signal DATA to the (i+2)-th data line DLi+2.

The second demultiplexers DMX2 may include a first switch SW21 and a second switch SW22.

The first switch SW21 may be connected to the (i+1)-th data line DLi+1. The first switch SW21 may be controlled by the first control signal CLA to apply the data signal DATA to the (i+1)-th data line DLi+1.

The second switch SW22 may be connected to the (i+3)-th data line DLi+3. The second switch SW22 may be controlled by the second control signal CLB to apply the data signal DATA to the (i+3)-th data line DLi+3.

For example, a pair of data lines connected to the first demultiplexer DMX1 may be a pair of odd data lines spaced (e.g., spaced apart) by two columns, and a pair of data lines connected to the second demultiplexer DMX2 may be a pair of even data lines spaced (e.g., spaced apart) by two columns.

Figure 13:
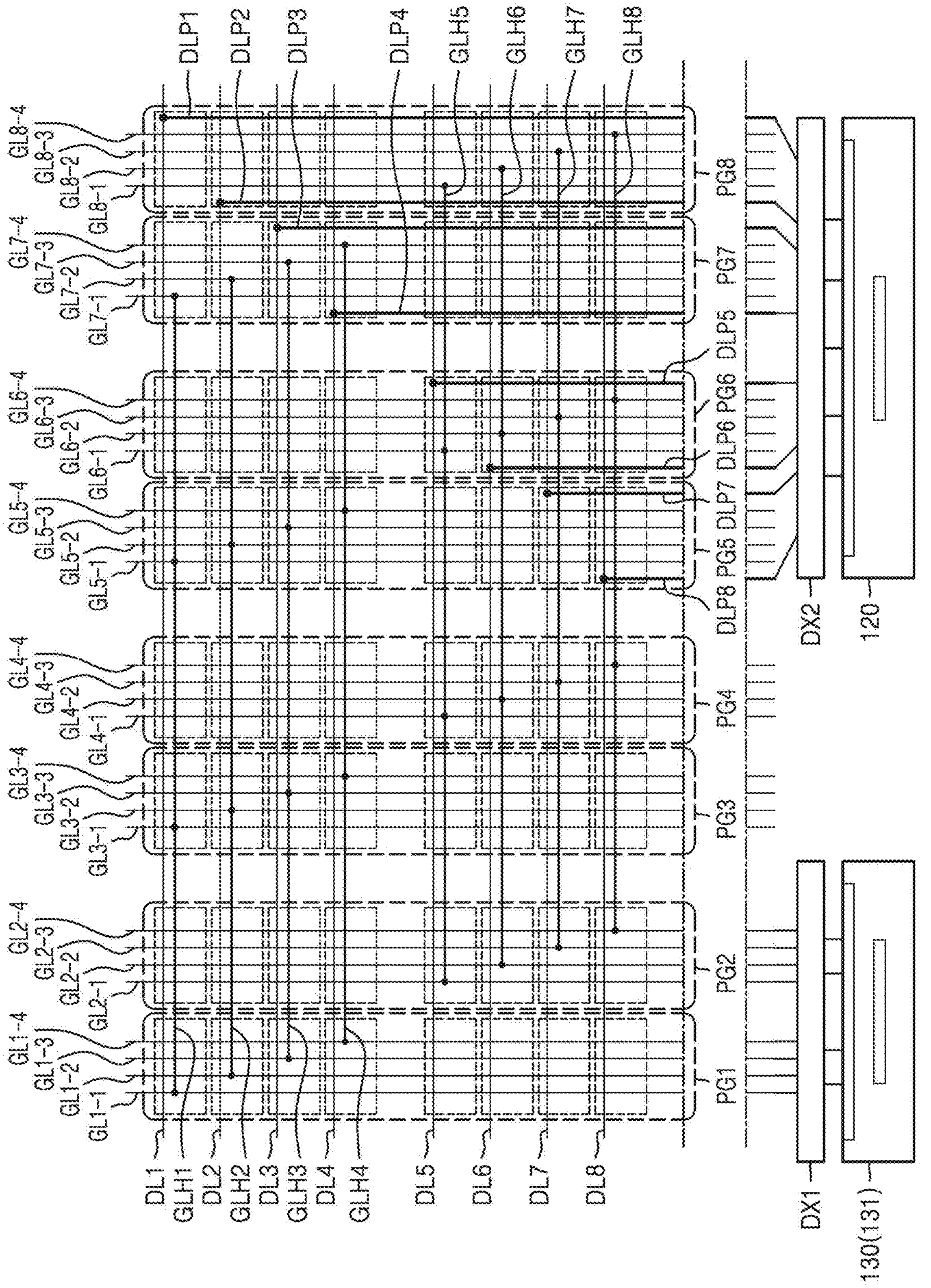
FIG. 13 is a schematic plan view illustrating an example of the display panel of FIG. 1.

FIG. 13 is a schematic plan view illustrating an example of the display panel of FIG. 1. For reference, descriptions of FIG. 13, which are substantially the same as those described above, may be omitted.

As shown in FIG. 13, the display panel of FIG. 1 may include a first signal distributor DX1 and a second signal distributor DX2. The first signal distributor DX1 is a demultiplexer for distributing scan signals and may be between the first gate driver 131 and the scan lines. For example, the first signal distributor DX1 may electrically connect the first gate driver 131 and the scan lines to each other. The structure and operating principle of the first signal distributor DX1 may be easily understood by those of ordinary skill in the art by means of FIG. 11 and the descriptions provided with reference to FIG. 11.

The second signal distributor DX2 is a demultiplexer for distributing data signals and may be between the data driver 120 and data lines (or vertical data lines). For example, the second signal distributor DX2 may electrically connect the data driver 120 and the data lines (or vertical data lines) to each other. The structure and operating principle of the second signal distributor DX2 may be easily understood by those of ordinary skill in the art by means of FIGS. 11 and 12 and the descriptions provided with reference to FIGS. 11 and 12.

As described above, the number of wires connected to the first gate driver 131 and the data driver 120 may be reduced by the first signal distributor DX1 and the second signal distributor DX2. As a result, the area of the peripheral area PA may be further reduced.

Also, for convenience of description and illustration, the display panel of FIG. 13 includes both the first signal distributor DX1 and the second signal distributor DX2, but this is merely an example. The display panel of FIG. 13 may include the first signal distributor DX1 or the second signal distributor DX2.

For example, in a plan view, the n-th pixel group may be between the (n−1)-th pixel group and the (n+1)-th pixel group. For example, in a plan view, the n-th scan line may be between the (n−1)-th scan line and the (n+1)-th scan line. For example, in a plan view, the n-th data line may be between the (n−1)-th data line and the (n+1)-th data line. For example, in a plan view, the n-th vertical data line may be between the (n−1)-th vertical data line and the (n+1)-th vertical data line. For example, in a plan view, the n-th horizontal scan line may be between the (n−1)-th horizontal scan line and the (n+1)-th horizontal scan line.

As described above, the present disclosure has been described with reference to the one or more embodiments shown in the accompanying drawings, but should be considered in a descriptive sense only. Those of ordinary skill in the art will understand that various modifications and equivalent embodiments may be made therefrom. Therefore, the true technical scope of protection of the present disclosure should be defined by the technical spirit of the appended claims.

According to the one or more embodiments described above, a display panel having a thin bezel may be achieved. However, the scope of the disclosure is not limited by the above effects.

It should be understood that the embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

What is claimed is:

1. A display apparatus comprising:
- a substrate including a display area and a first peripheral area, the first peripheral area being on one side of the display area;
- a first gate driver in the first peripheral area;
- a data driver in the first peripheral area;
- a plurality of pixel groups in the display area and comprising a plurality of pixels arranged along a first direction in a plan view, the plurality of pixel groups comprising at least a first pixel group, a second pixel group, a third pixel group, and a fourth pixel group;

a first scan line extending in the first direction in the plan view and connecting the first gate driver and the first pixel group to each other;

a second scan line extending in the first direction in the plan view and connecting the first gate driver and the second pixel group to each other;

a third scan line extending in the first direction in the plan view and connecting the first gate driver and the third pixel group to each other; and a first horizontal scan line extending in a second direction in the plan view, wherein the first horizontal scan line connects the first scan line connected to pixels in the first pixel group and the third scan line connected to pixels in the third pixel group to each other, the second direction crossing the first direction.

2. The display apparatus of claim 1, wherein the first scan line is configured to receive a first scan signal from the first gate driver and transmit the first scan signal to the first pixel group, and wherein the third scan line is configured to receive the first scan signal through the first horizontal scan line and transmit the first scan signal to the third pixel group.

3. The display apparatus of claim 2, further comprising:

a fourth scan line extending in the first direction in the plan view and connecting the first gate driver and the fourth pixel group to each other; and a second horizontal scan line extending in the second direction in the plan view and connecting the second scan line and the fourth scan line to each other.

4. The display apparatus of claim 3, wherein the second scan line is configured to receive a second scan signal from the first gate driver and transmit the second scan signal to the second pixel group, and wherein the fourth scan line is configured to receive the second scan signal through the second horizontal scan line and transmit the second scan signal to the fourth pixel group.

5. The display apparatus of claim 1, further comprising:

a first data line connected to pixels of the first pixel group and extending in the second direction in the plan view; and a first vertical data line extending in the first direction in the plan view and connecting the first data line and the data driver to each other.

6. The display apparatus of claim 5, wherein, in the plan view, the first gate driver is located at one side of the first peripheral area, and the data driver is located at an other side of the first peripheral area.

7. The display apparatus of claim 6, wherein, in the plan view, the first vertical data line is in an area of the display area, the area corresponding to the other side of the first peripheral area.

8. The display apparatus of claim 7, wherein, in the plan view, the first scan line is in an area of the display area, the area corresponding to the one side of the first peripheral area.

9. The display apparatus of claim 1, further comprising a plurality of scan lines comprising at least the first scan line, the second scan line, and the third scan line, wherein the first horizontal scan line is connected to 4n scan lines from among the plurality of scan lines.

10. The display apparatus of claim 9, wherein one scan line from among the 4n scan lines is connected to the first gate driver, and the 4n scan lines are configured to receive a same scan signal generated by the first gate driver.

11. A display apparatus comprising:

a substrate including a display area and a first peripheral area, the first peripheral area being on one side of the display area;

a first gate driver in the first peripheral area;

a data driver in the first peripheral area;

a second gate driver in the first peripheral area, wherein, in a plan view, the second gate driver is between the first gate driver and the data driver;

a plurality of pixel groups in the display area and comprising a plurality of pixels arranged along a first direction in the plan view; and a plurality of scan lines extending in the first direction in the plan view, wherein some scan lines from among the plurality of scan lines are connected to the first gate driver and other scan lines from among the plurality of scan lines are connected to the second gate driver, wherein each of the plurality of scan lines is connected to a corresponding pixel group of the plurality of pixel groups, and wherein the some scan lines and the other scan lines are connected to each other by a plurality of horizontal scan lines extending in a second direction crossing the first direction.

12. The display apparatus of claim 11, wherein the plurality of pixel groups comprises at least a first pixel group, a second pixel group, a third pixel group, a fourth pixel group, a fifth pixel group, a sixth pixel group, a seventh pixel group, and an eighth pixel group, and wherein the plurality of scan lines comprises a first scan line, a second scan line, a third scan line, a fourth scan line, a fifth scan line, a sixth scan line, a seventh scan line, and an eighth scan line respectively connected to the first pixel group to the eighth pixel group.

13. The display apparatus of claim 12, wherein the plurality of horizontal scan lines comprises a first horizontal scan line, and wherein the first scan line is connected to the first pixel group and connected to the fifth scan line and the seventh scan line by the first horizontal scan line.

14. The display apparatus of claim 12, further comprising:

a first data line connected to pixels of the first pixel group and extending in the second direction in the plan view, the second direction crossing the first direction; and a first vertical data line extending in the first direction in the plan view and connecting the first data line and the data driver to each other.

15. The display apparatus of claim 13, wherein the plurality of horizontal scan lines further comprises a first additional horizontal scan line, and wherein the seventh scan line is connected to the third scan line by the first additional horizontal scan line.

16. The display apparatus of claim 15, wherein, in the plan view, the first horizontal scan line and the first additional horizontal scan line are spaced from each other in the first direction.

17. The display apparatus of claim 15, wherein the first pixel group, the third pixel group, the fifth pixel group, and the seventh pixel group are configured to receive a same scan signal generated by the first gate driver.

18. The display apparatus of claim 15, wherein the first scan line is connected to the first gate driver, and the third scan line is connected to the second gate driver.

19. The display apparatus of claim 15, wherein the plurality of horizontal scan lines further comprises a second horizontal scan line, and wherein the second scan line is connected to the second pixel group and connected to the sixth scan line and the eighth scan line by the second horizontal scan line.

20. The display apparatus of claim 19, wherein the plurality of horizontal scan lines further comprises a second additional horizontal scan line, and wherein the eighth scan line is connected to the fourth scan line by the second additional horizontal scan line.

* * * * *